US006713943B1

(12) United States Patent
Matsuda et al.

(10) Patent No.: US 6,713,943 B1
(45) Date of Patent: Mar. 30, 2004

(54) ACTUATOR AND DRIVING METHOD THEREOF

(75) Inventors: Shinya Matsuda, Kyoto (JP); Takashi Matsuo, Itami (JP); Masayuki Ueyama, Takarazuka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/591,622

(22) Filed: Jun. 9, 2000

(30) Foreign Application Priority Data

Jun. 14, 1999 (JP) .......................................... 11-166919
Jun. 30, 1999 (JP) .......................................... 11-185197

(51) Int. Cl.[7] ................................................. H02N 2/08
(52) U.S. Cl. ...................................... 310/328; 310/317
(58) Field of Search ............................ 310/316.01, 317, 310/328

(56) References Cited

U.S. PATENT DOCUMENTS

| 4,613,782 A | | 9/1986 | Mori et al. ................. 310/323 |
| 4,947,077 A | | 8/1990 | Murata et al. .............. 310/328 |
| 4,950,135 A | | 8/1990 | Tojo et al. ................... 417/410 |
| 5,132,582 A | * | 7/1992 | Hayashi et al. ............. 310/328 |
| 5,424,597 A | | 6/1995 | Glöss et al. ................. 310/328 |
| 5,523,643 A | | 6/1996 | Fujimura et al. ........... 310/328 |
| 5,563,465 A | * | 10/1996 | Nakahara et al. .......... 310/328 |
| 5,616,980 A | * | 4/1997 | Zumeris ................. 310/323.17 |
| 5,900,691 A | | 5/1999 | Reuter et al. ............... 310/348 |
| 6,066,911 A | | 5/2000 | Lindemann et al. ... 310/323.02 |
| 6,201,340 B1 | * | 3/2001 | Matsuda et al. ............ 310/328 |

FOREIGN PATENT DOCUMENTS

| JP | 53-82286 A | * | 7/1978 | ................. 310/328 |
| JP | 62-58883 A | * | 3/1987 | ................. 310/328 |
| JP | 5-184172 A | * | 7/1993 | ................. 310/328 |

OTHER PUBLICATIONS

U.S. patent application Ser. No. 09/583,366, filed May 31, 2000.
U.S. patent application Ser. No. 09/697,570, filed Oct. 26, 2000.
Keisuke Sasae et al, "Development of a Small Actuator with Three Degrees of Rotational Freedom" ($2^{nd}$ Report), *Journal of Precision Engineering Institution*, vol. 51, No. 4, 1995, pp. 532–536.

(List continued on next page.)

*Primary Examiner*—Thomas M. Dougherty
(74) *Attorney, Agent, or Firm*—Sidley Austin Brown & Wood LLP

(57) ABSTRACT

A truss type actuator including two piezoelectric devices drives a chip member provided at a crossing point of the piezoelectric devices for moving along an elliptic or a circular trail. The piezoelectric devices are respectively driven by driving signals having a frequency equal to or near to the resonance frequency of the piezoelectric devices. By utilizing the resonance phenomenon, the displacements of the piezoelectric device can be increased as larger as possible.

15 Claims, 20 Drawing Sheets

OTHER PUBLICATIONS

Keisuke Sasae et al, "Development of a Small Actuator with Three Degrees of Rotational Freedom" ($3^{rd}$ Report), *Journal of Precision Engineering Institution*, vol. 62, No. 4, 1996, pp. 599–603.

Minoru Kuribayashi et al, "Transducer for High Speed and Large Thrust Ultrasonic Linear Motor Using Two Sandwich-–Type Vibrators", *IEEE Transactions on Ultrasonics, Ferroelectronics, and Frequency Control*, vol. 45, No. 5, Sep., 1998, pp. 1188–1195.

Sogo Denshi Shuppansha Japan, "*Admission Into Ultrasonic Motor*", Feb. 20, 1991 (4 pages).

Keisuke Sasae et al, "*Development of a Small Actuator with Three Degrees of Rotational Freedom*", $1^{st}$ Report, *Journal of Precision Engineering Institution*, vol. 61, No. 3, 1995 (pp. 386–390).

Hideaki Oku et al, "*First Report of Piezoelectric Traveling Wave Type Linear Actuator*", *Collection of Lecture of Precision Engineering Institution*, Spring, 1995 (2 pages).

S. Nagatome et al, "*Manufacture and Estimation of Thin Ultrasonic Linear Motor*", *Collection of Lecture of Precision Engineering Institution*, Spring, 1998 (3 pages).

* cited by examiner

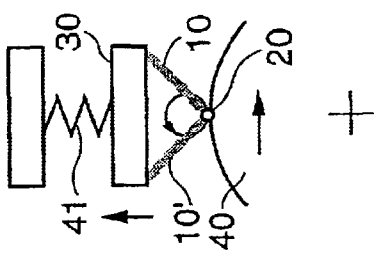
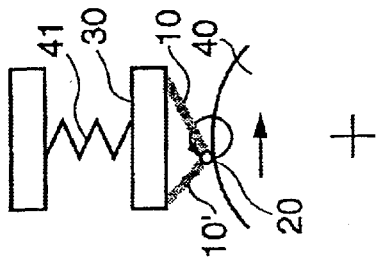
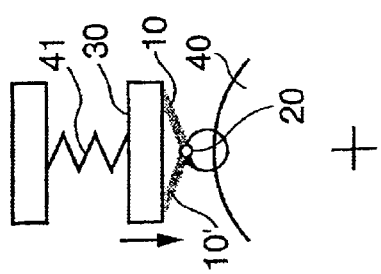
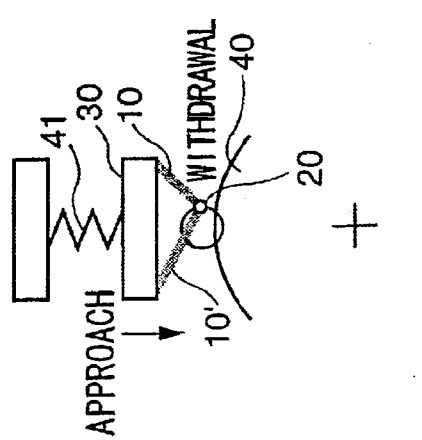
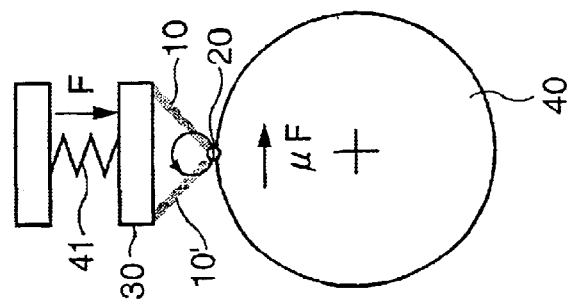

PHASE DIFFERENCE 0°

PHASE DIFFERENCE 45°

PHASE DIFFERENCE 90°

PHASE DIFFERENCE 135°

PHASE DIFFERENCE 180°

AN END CONSTRAINED

SPRING CONSTANT : k=SE/L
MASS : m
ANGULAR FREQUENCY : $\omega^2$=k/ (m/3)

S : CROSS-SECTIONAL AREA
L : LENGTH

NODE

BOTH ENDS FREE k' = SE/ (L/2)
  = 2k
m' = m/2
$\omega'^2$ = k'/(m'/3)
  = $(2\omega)^2$

NODE

EXPANSIVE MOTION

EXPANSIVE MOTION

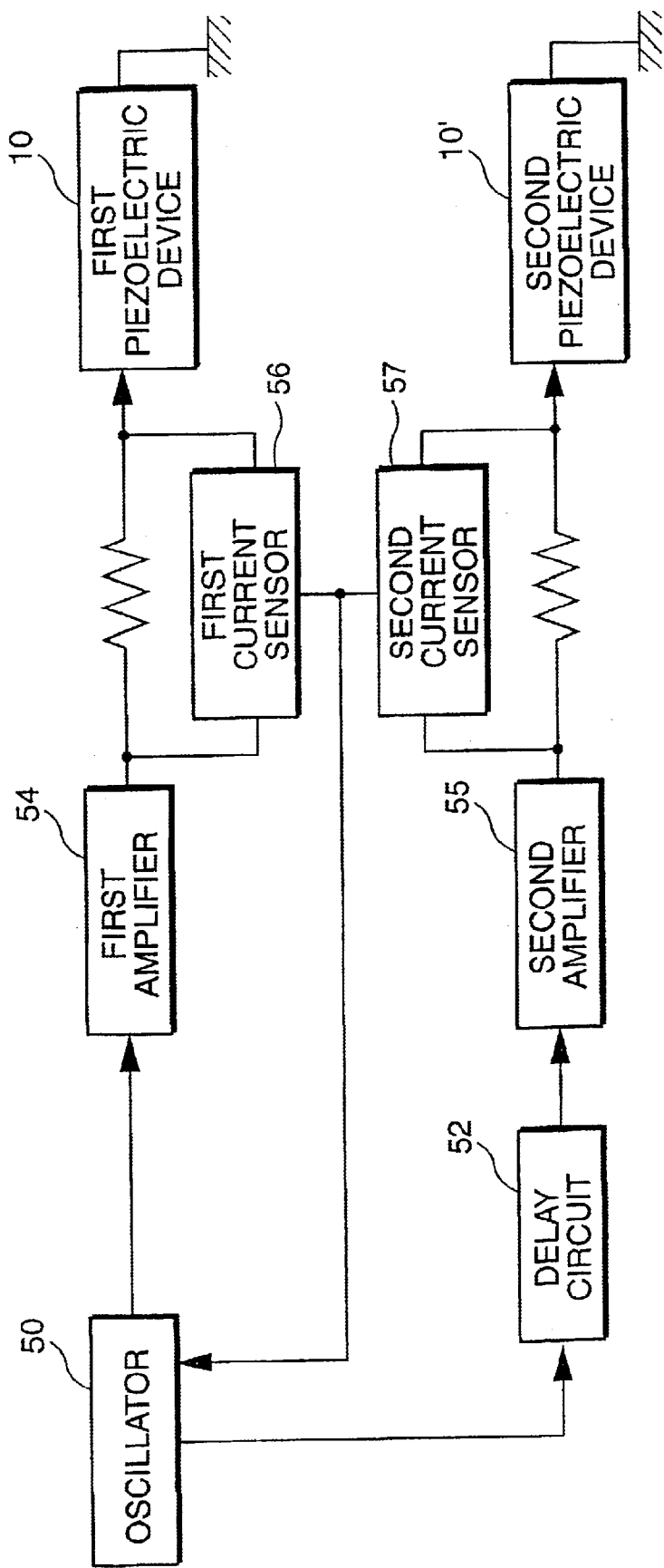

ACTUATOR AND DRIVING METHOD THEREOF

This application is based on patent applications Hei.11-166919 and Hei.11-185197 filed in Japan, the contents of which are hereby incorporated by reference.

BACKGROUND OF THE INVENTION

1. Field of the Invention

This invention relates to an actuator, such as a truss type actuator for generating an elliptic movement of a driven object by composition of displacements of a plurality of displacing devices where the displacing devices are driven by using resonance phenomenon, and methods for driving the actuator.

2. Description of the Related Art

A first conventional truss type actuator is shown in "Development of a Small Actuator with Three Degrees of Rotational Freedom (1st Report)" by K. SASAE et. al., Journal of Precision Engineering Institution, Vol.61, No.31, 1995. In the first conventional actuator, a chip member is provided at a crossing point of three lamination type piezoelectric devices. The piezoelectric devices are driven for moving the chip member so as to trail a spherical surface, so that a spherical driven member can be revolved in an optional direction. Since the piezoelectric devices are driven in non-resonance mode, the displacement of the piezoelectric devices are not so large and the driving efficiency of the actuator is relatively low.

A second conventional truss type actuator is shown in "Manufacture and Estimation of Thin Ultrasonic Linear Motor" by S. NAGATOME, et. al., Collection of Lecture of Precision Engineering Institution, in Spring, 1998. In the second conventional actuator, a steel plate is blanked so that two displacing portions cross at a right angle. Piezoelectric devices are fixed on respective displacing portions. One of the piezoelectric device is resonantly driven for colliding the peak at the crossing point of the displacing portions with a driven member obliquely. Thus, the driven member is moved in a predetermined direction. Since the piezoelectric device is driven in resonance mode, the displacement of the piezoelectric device can be made larger. The peak of the steel plate, however, collides with the driven member linearly, so that acoustic noise and vibrations of the actuator are relatively larger. Furthermore, the steel plate and the driven member are heavily worn. Also, the actuator has no mechanism for detecting the displacement of the piezoelectric device, so that it is difficult to control the moving speed of the driven member.

A third conventional traveling wave type actuator is shown in the publication of "Admission into Ultrasonic Motor" by Sogo Denshi Shuppansha Japan. In the third conventional actuator, a plurality of piezoelectric devices are adhered on a circular elastic member at a predetermined interval. When the elastic member is resonantly vibrated by driving the piezoelectric devices, traveling waves are formed in a direction parallel to an axis of the circular elastic member. A driven member disposed on the circular elastic member can be rotated around the axis of the circular elastic member. Since the elastic member and the driven member are shaped to be circular, freedom for designing an apparatus using the actuator becomes narrower.

A fourth conventional linear actuator is shown in "First Report of Piezoelectric Traveling Wave type Linear Actuator" by H. OKU, et. al., Collection of Lecture of Precision Engineering Institution, in Spring, 1995. In the fourth conventional actuator, a plurality of piezoelectric devices are adhered on a side wall of an endless elastic member. Each piezoelectric device is driven by two kinds of the natural vibration modes, and the displacements of the vibrations of the piezoelectric devices are compounded so as to generate the traveling waves on the surface of the elastic member and parallel to the endless section of the elastic member. Since the whole of the elastic member is vibrated, a mass of an object to be vibrated by the piezoelectric devices becomes larger. Thus, the frequencies of the driving signals for driving the piezoelectric device become smaller, and an output of the actuator become smaller. Furthermore, it is difficult not only to control the condition for resonantly vibrating the elastic member but also to connect the elastic member. Also, since the deformation of the elastic member is complex, it is difficult to control the condition to obtain a desired elliptic movement.

SUMMARY OF THE INVENTION

An object of this invention is to provide an actuator having a simple configuration and high driving efficiency, which can easily be controlled.

An actuator in accordance with an aspect of this invention comprises a plurality of displacing devices for generating displacements; a compound member connected to the displacing devices and for compounding displacements of the displacing devices; a base member for folding base ends of the displacing devices at which the compound member is not connected; a pressing member for pressing the compound member to an object to be driven; and a driver for resonantly driving the displacing devices so as to move the compound member an elliptic or a circular trail.

By the above-mentioned configuration, the displacing devices are resonantly driven, so that the displacements of the displacing devices are enlarged. Thus, the driving efficiency of the actuator can be increased.

BRIEF DESCRIPTION OF THE DRAWINGS

FIGS. 7A to 7E are schematic views for showing rotation mechanism of the rotor by the actuator in this embodiment;

FIG. 22 is a block diagram for showing a configuration of another modified driving circuit of the actuator in this embodiment;

DETAILED DESCRIPTION OF THE EMBODIMENT

Figure 1:
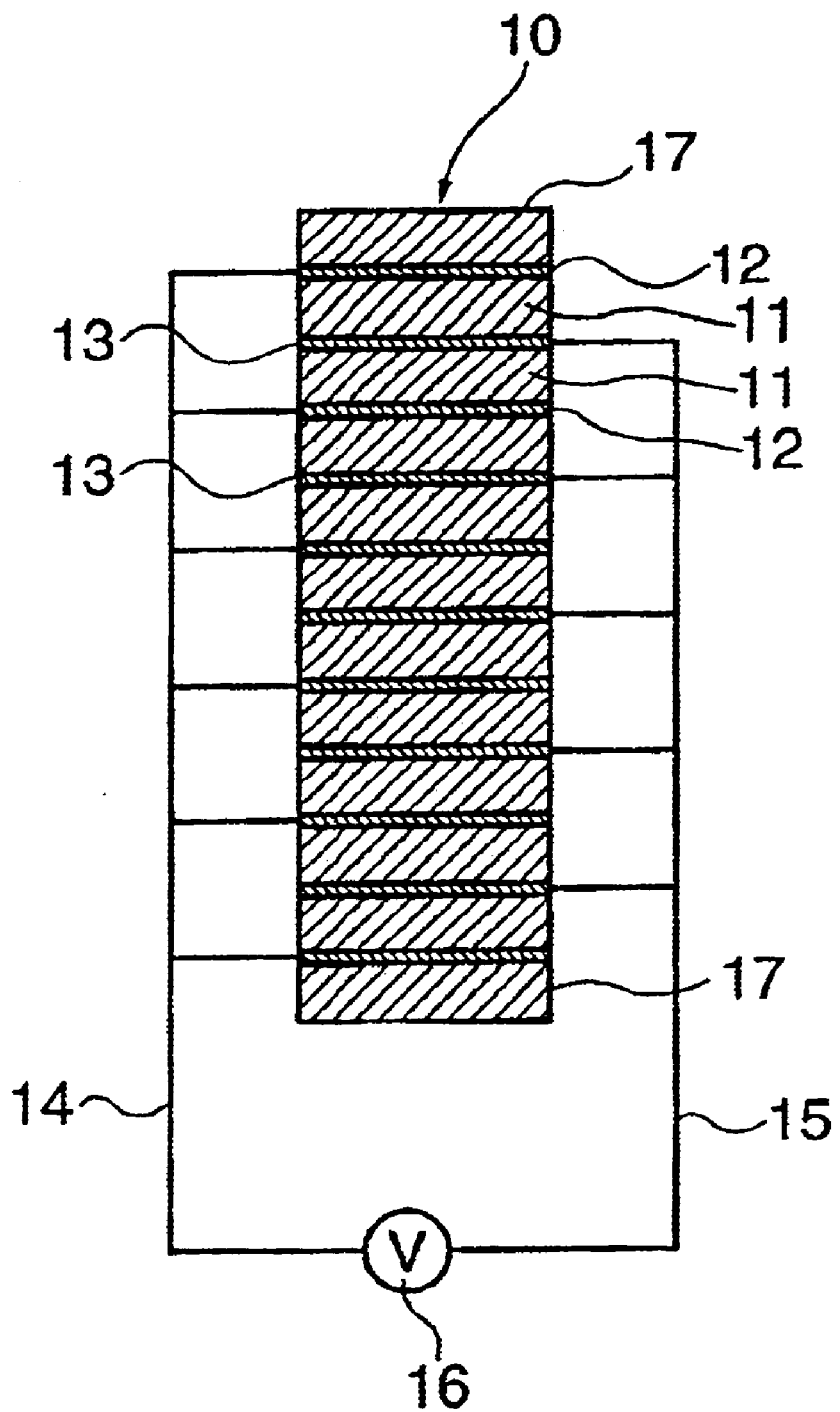
FIG. 1 is a front view showing a configuration of a lamination type piezoelectric device used as a displacing device in an embodiment of this invention.

An embodiment of this invention is described. A configuration of a lamination type piezoelectric device used as a displacing device in this embodiment is shown in FIG. 1. The lamination type piezoelectric device 10 is formed by piling up of a plurality of ceramic thin plates 11 and electrodes 12 and 13 alternately disposed. The ceramic thin plates 11 is made of such as PZT showing piezoelectric characteristic. The ceramic thin plates 11 and the electrodes 12 and 13 are fixed by an adhesive. Two groups of electrodes 12 and 13 which are alternately disposed are respectively connected to a driving power source 16 via cables 14 and 15. When a predetermined voltage is applied between the cables 14 and 15, an electric field is generated in each ceramic thin plate 11 disposed between the electrodes 12 and 13. The direction of the electric field in the ceramic thin plates alternately disposed is the same. Thus, the ceramic thin plates 11 are piled in a manner so that polarization direction of the ceramic thin plates 11 alternately disposed becomes the same. In other words, the polarization directions of adjoining two ceramic thin plates are opposite to each other. Furthermore, protection layers 17 are provided on both ends of the piezoelectric device 10.

Figure 2:
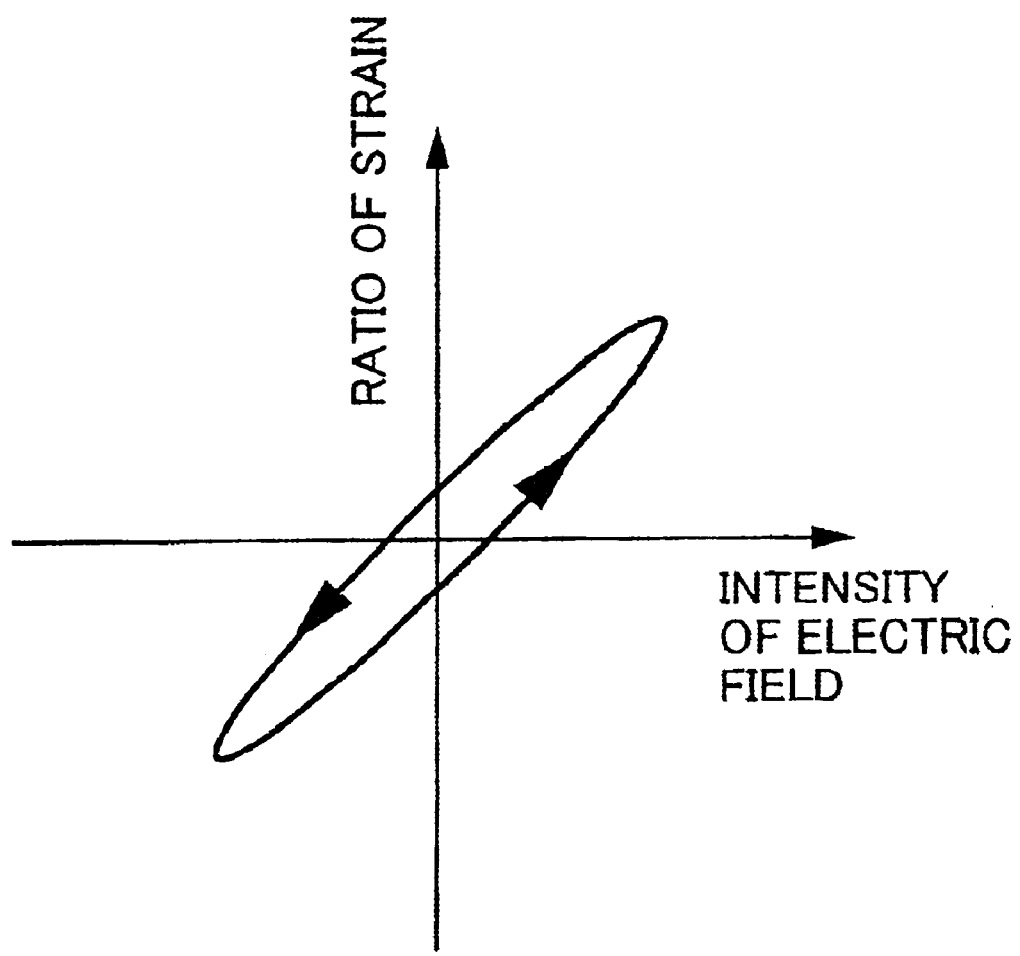
FIG. 2 is a graph for showing a relation between displacement of a piezoelectric device and electric field applied to the piezoelectric device.

When a DC driving voltage is applied between the electrodes 12 and 13, each ceramic thin plate 11 expands or contracts in the same direction. Thus, whole piezoelectric device 10 can expand and contract. When the electric field in the ceramic thin plate 11 is sufficiently small and hysteresis of the displacement of the ceramic thin plate 11 can be ignored, it is possible to consider that a relation between the displacement of the piezoelectric device 10 and the electric field generated between the electrodes 12 and 13 is linear. The relation between the displacement of the piezoelectric device and the electric field is shown in FIG. 2. In FIG. 2, the abscissa shows the intensity of electric field and the ordinate shows the ratio of strain of the piezoelectric device.

When an AC driving voltage (signal) is applied between the electrodes 12 and 13 by the driving power source 16, all the ceramic thin plates 11 repeat the expansion and the contraction in the same direction corresponding to the intensity of the electric fields. As a result, the piezoelectric device 10 can repeat the expansion and the contraction. The piezoelectric device 10 has an inherent resonance frequency defined by the configuration and the electric characteristics thereof. When the frequency of the AC driving voltage coincides with the resonance frequency of the piezoelectric device 10, the impedance of the piezoelectric device 10 is reduced and the displacement thereof increases. Since the displacement of the piezoelectric device 10 is small with respect to the size thereof, it is preferable to utilize the resonance phenomenon for driving the piezoelectric device by a low driving voltage.

Figure 3:
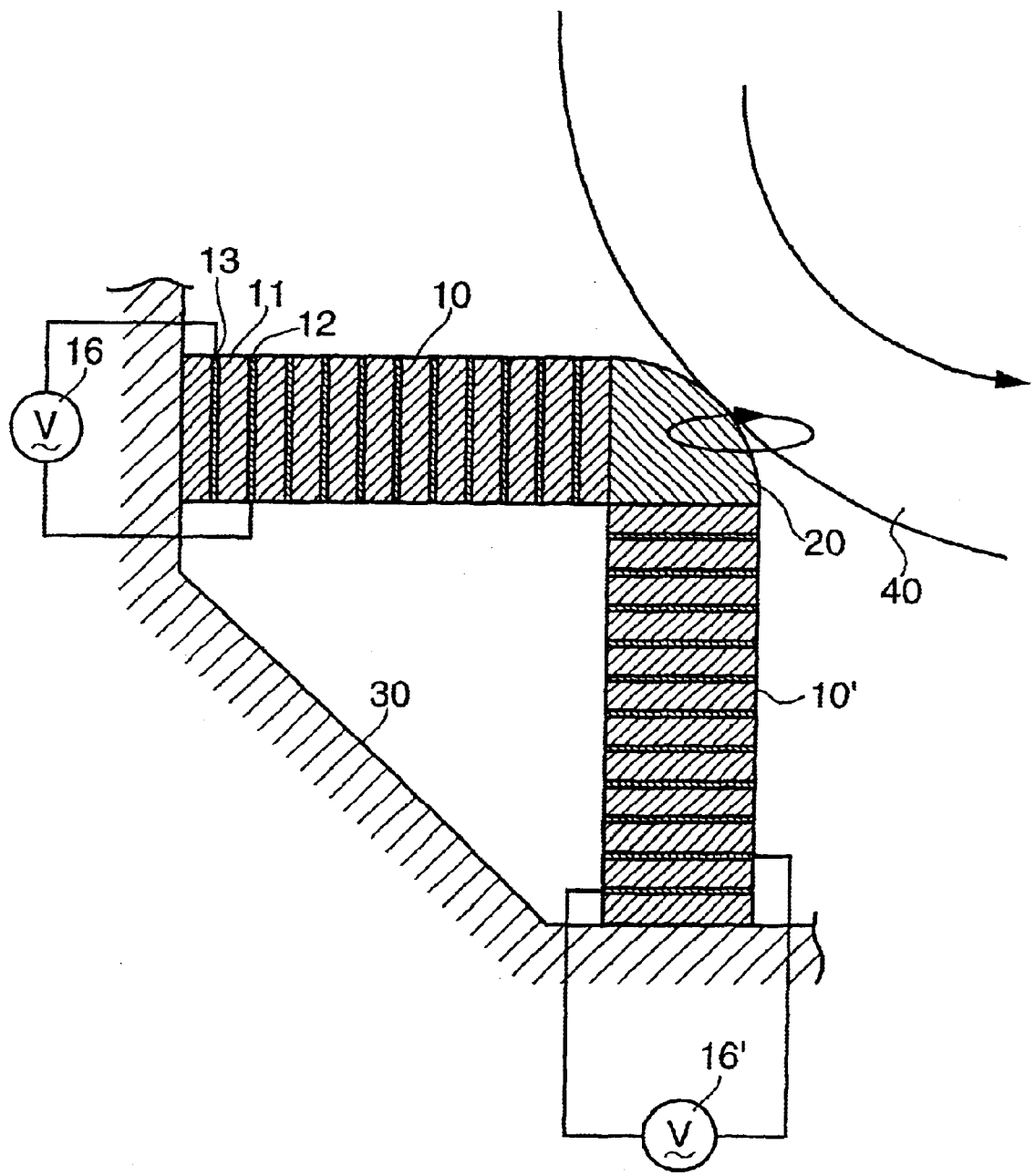
FIG. 3 is front view for showing a configuration of an actuator in this embodiment.

A configuration of a truss type actuator in this embodiment is shown in FIG. 3. A first piezoelectric device 10 and a second piezoelectric device 10' serving as displacing devices are disposed to cross substantially at right angle. A chip member 20 serving as a compound member for compounding the displacements of the first piezoelectric device 10 and the second piezoelectric device 10' is disposed at crossing point and connected on respective top ends of the first piezoelectric device 10 and the second piezoelectric device 10' by an adhesive. Base ends of the first piezoelectric device 10 and the second piezoelectric device 10' are respectively fixed on a base member 30 by an adhesive. As a material of the chip member 20, it is preferable to use a material such as tungsten having high friction factor and high wear resistance. As a material of the base member 30, it is preferable to use a material such as stainless steel having high workability and strength. As a material of the adhesive, it is preferable to use a material such as epoxy resin having high adhesive strength. The first piezoelectric device 10 and the second piezoelectric device 10' are substantially the same as the piezoelectric device 10 shown in FIG. 1. Elements for constituting the second piezoelectric device 10' are distinguished from those of the first piezoelectric device 10 by adding (') to the numerals.

In this actuator, the first piezoelectric device 10 and the second piezoelectric device 10' are respectively driven by AC driving signals having a predetermined phase difference, so that the chip member 20 can be moved elliptically or circularly. When the chip member 20 is pushed on, for example, a cylindrical surface of a rotor 40 which can rotate around a predetermined axis, the elliptic or circular movement of the chip member 20 can be converted to the rotation of the rotor 40. Alternatively, when the chip member 20 is pushed on a plane surface of a rod shaped member (not shown), the elliptic or circular movement of the chip member 20 can be converted to a rectilinear motion of the rod shaped member. As a material of the rotor 40, it is preferable to use a material such as aluminum having a light weight.

Furthermore, it is preferable to form an anodic oxide coating on the surface of the rotor 40 for preventing the wear due to the friction between the chip member 20 and the rotor 40.

Figure 4:
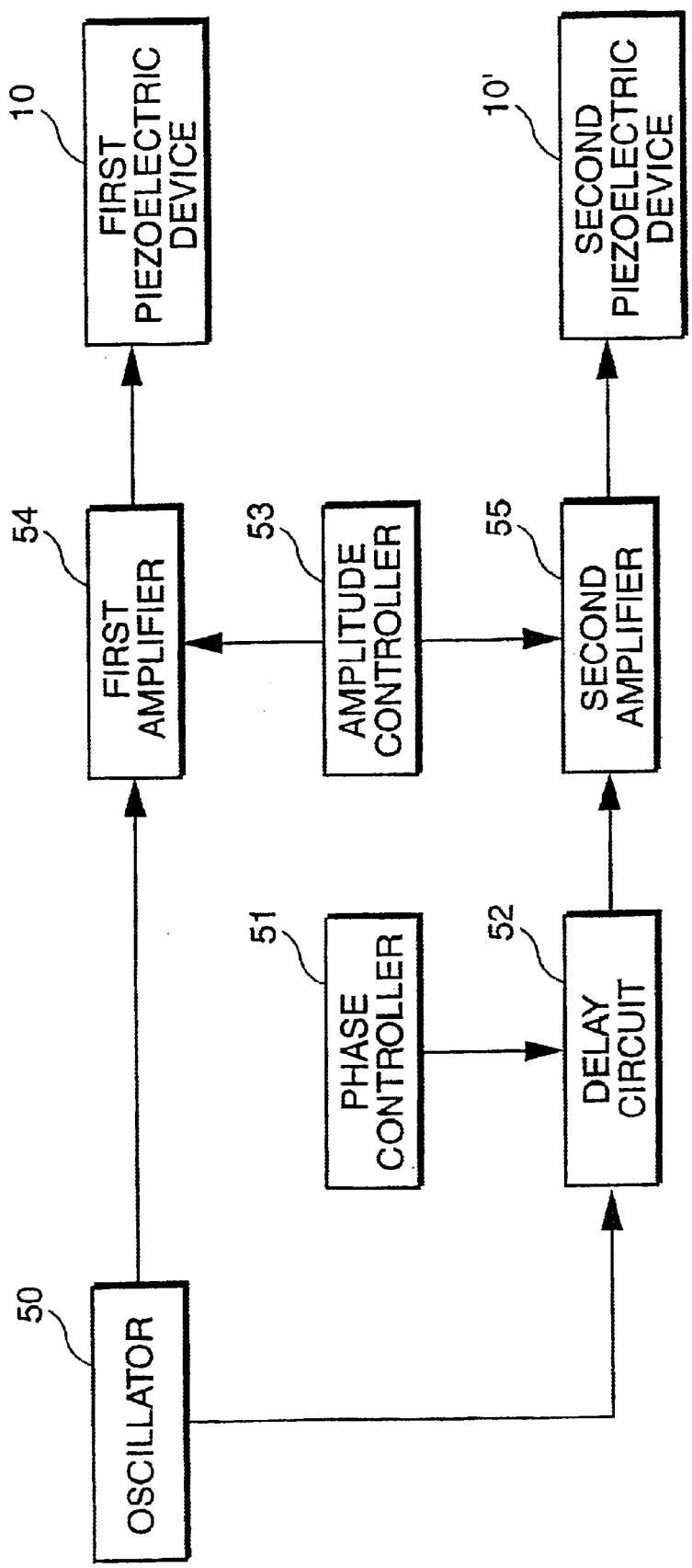
FIG. 4 is a block diagram for showing a configuration of a driving circuit of the actuator in this embodiment.

A block diagram of a driving circuit is shown in FIG. 4. An oscillator 50 generates sine wave signals having a predetermined frequency coinciding with resonance frequencies of the first piezoelectric device 10 and the second piezoelectric device 10' in the same phase mode and in the opposite phase mode which will be described below. A phase controller 51 controls a delay circuit 52 corresponding to rotation speed, driving torque, rotation direction of the rotor 40 so as to generate sine wave signals having a predetermined phase difference. An amplitude controller 53 controls a first amplifier 54 and a second amplifier 55 for amplifying two sine wave signals having a phase difference. The amplified sine wave signals amplified by the first amplifier 54 and the second amplifier 55 are respectively applied to the piezoelectric device 10 and the second first piezoelectric device 10'.

Figure 5:
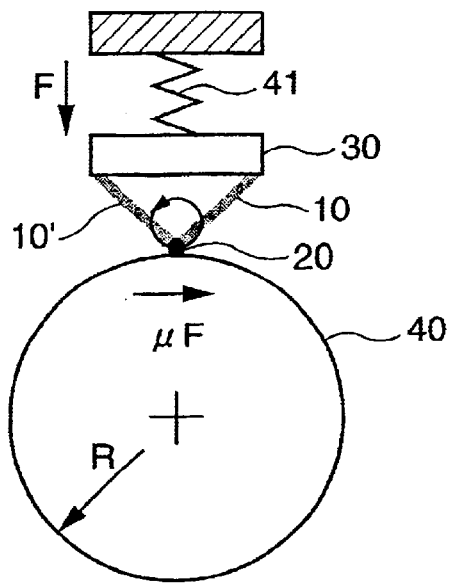
FIG. 5 is a schematic view for showing the actuator pressed on a rotor in this embodiment.

A principle of the rotation of the rotor 40 by the actuator is described. FIG. 5 shows that the actuator shown in FIG. 3 is pressed on the rotor 40 by a pressure F of a spring 41. In FIG. 5, the symbol $\mu$ designates the friction factor. Furthermore, the voltage of the driving signals applied to or the displacements of the first piezoelectric device 10 and the second piezoelectric device 10' are shown in FIG. 6.

Figure 6:
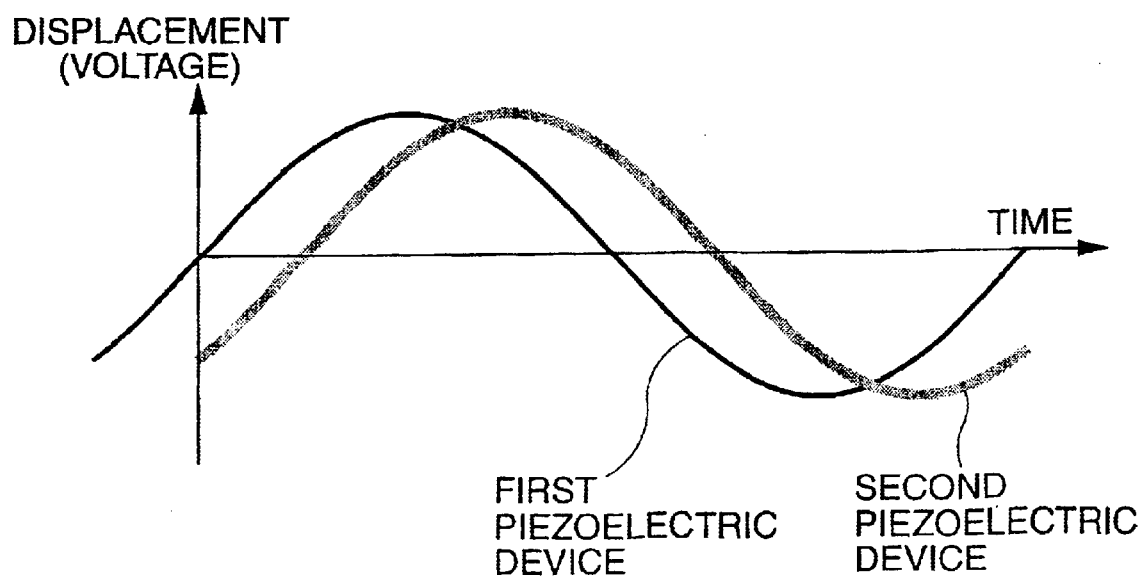
FIG. 6 is a graph for showing waveforms of driving signals applied to the piezoelectric devices of the actuator.
Figure 8A:
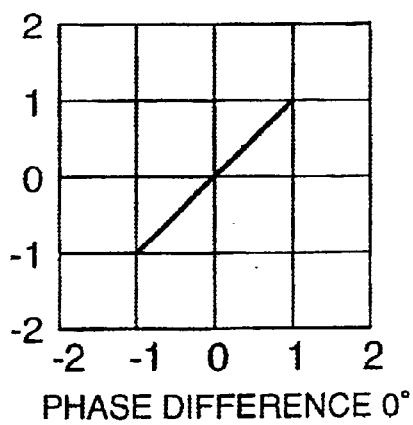
FIGS. 8A to 8E are graphs for showing trails of a chip member when amplitude of vibrations of two piezoelectric devices are equal to each other but the phase difference of the vibrations are respectively 0, 45, 90, 135 and 180 degrees.
Figure 8B:
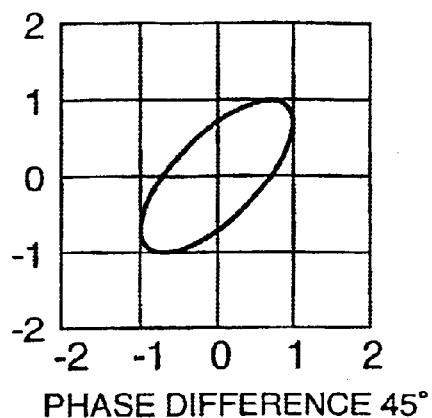
Figure 8C:
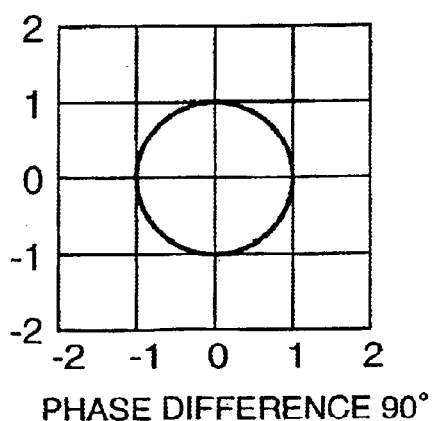
Figure 8D:
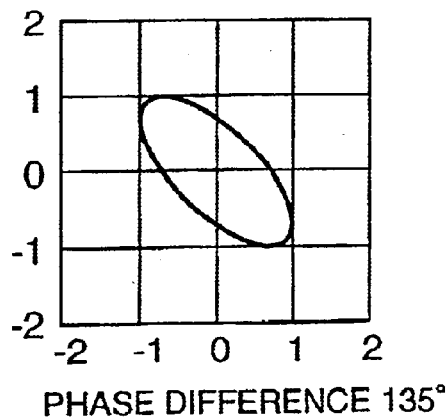
Figure 8E:
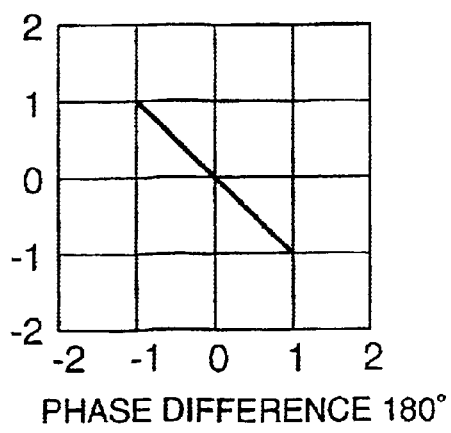

When the driving signals having the phase difference shown in FIG. 6 are respectively applied to the first piezoelectric device 10 and the second piezoelectric device 10', the first piezoelectric device 10 and the second piezoelectric device 10' are displaces as sine wave form. As a result, the chip member 20 connected to the first piezoelectric device 10 and the second piezoelectric device 10' moves elliptically or circularly.

When the frequency of the driving signals applied to the first piezoelectric device 10 and the second piezoelectric device 10' is small and the rotation speed of the chip member 20 is slow, the actuator follows the displacement of the chip member 20 by the pressure F of the spring 41. Thus, the chip member 20 cannot be departed from the surface of the rotor 40, so that the chip member 20 is reciprocally driven with contacting the rotor 40. Thus, the rotor 40 cannot be rotated.

On the other hand, when the frequency of the driving signals applied to the first piezoelectric device 10 and the second piezoelectric device 10' is larger and the rotation speed of the chip member 20 is fast, the actuator cannot follow the displacement of the chip member 20, so that the chip member 20 can temporarily be departed from the surface of the rotor 40. Thus, the chip member 20 can be moved in a predetermined direction while the chip member 20 is departed from the surface of the rotor 40, and the chip member 20 can be moved in the opposite direction with the rotor 40 while the chip member 20 contacts the rotor 40. As a result, the rotor 40 can be rotated.

The rotation mechanism of the rotor 40 by the actuator is shown in FIGS. 7A to 7E. FIGS. 7A and 7E show that both of the first piezoelectric device 10 and the second piezoelectric device 10' expand and the chip member 20 contacts the surface of the rotor 40. FIG. 7B shows that the first piezoelectric device 10 contracts, the second piezoelectric device 10' expands and the chip member 20 is departed from the surface of the rotor 40. FIG. 7C shows that both of the first piezoelectric device 10 and the second piezoelectric device 10'contract and the chip member 20 is departed from the surface of the rotor 40. FIG. 7D shows that the first piezoelectric device 10 expands, the second piezoelectric device 10' contracts, but the actuator follows the movement of the chip member 20 so that the chip member 20 contacts the surface of the rotor 40. As can be seen from FIGS. 7A to 7E, it is possible to rotate the rotor 40 by departing the chip member 20 from the surface of the rotor 40.

Subsequently, the driving signals for driving the first piezoelectric device 10 and the second piezoelectric device 10' are described. When two independent movements crossing at right angle are compounded, the crossing point moves along an elliptic trail including the circular trail defined by the Lissajous' equation. FIGS. 8A to 8E show trails of the chip member 20 when the amplitude of the vibrations of the first piezoelectric device 10 and the second piezoelectric device 10' are equal to each other but the phase difference of the vibrations are respectively 0, 45, 90, 135 and 180 degrees.

As mentioned above, it is possible to control the rotation direction, the rotation speed and the torque of the rotor 40 by controlling the trail of the chip member 20. More concretely, when the diameter of the trail of the chip member 20 in the tangential direction of the rotor 40 is enlarged, the rotation speed of the rotor 40 can be increased. Alternatively, when the diameter of the trail of the chip member 20 in the normal direction of the rotor 40 is enlarged, the torque of the rotor 40 can be increased. When the phase difference between the driving signals for the first piezoelectric device 10 and the second piezoelectric device 10' are reversed, the rotation direction of the rotor 40 can be reversed.

Subsequently, a method for controlling the trail of the chip member 20 to be circular is considered, The first piezoelectric device 10 and the second piezoelectric device 10' are respectively driven under resonance vibration by using the driving signals with the phase difference of 90 degrees.

The actuator shown in FIG. 3 was actually manufactured. When the first piezoelectric device 10 and the second piezoelectric device 10' were respectively driven by the driving signals having the frequencies near to the resonance frequency of the first piezoelectric devices 10 and the second piezoelectric device 10', the trail of the chip member 20, which was essentially to be circular, was deformed to be elliptical largely in which the axes of the ellipse are largely slanted from the axes corresponding to the tangent and the normal at the contacting point of the rotor 40 and the chip member 20. In the experimental process, it was found that the vibrations of the first piezoelectric device 10 and the second piezoelectric device 10' are affected each other via the chip member 20 and the base member 30, so that the above-mentioned phenomenon occurred. Since the vibration of one piezoelectric device is transmitted to the other piezoelectric device with the phase delay of about 90 degrees, the vibration transmitted thereto is superimposed on the displacement of the piezoelectric device owing to the driving signals. Thus, the displacement of the piezoelectric device displacing second is enlarged, and the displacement of the other piezoelectric device displacing first is contracted. As a result, the trail of the chip member 20 was deformed to be elliptical expanded in the direction parallel to the displacement of the piezoelectric device displacing second.

For solving this phenomenon, it is necessary to prevent the transmission of the vibration of one piezoelectric device to the other as small as possible, and to realize a system in which two piezoelectric devices can be vibrated independently. When the system is realized, the trail of the chip member 20 can be made circular in every frequency band including the resonance frequency. Furthermore, when the amplitude and the phase difference of the driving signals are varied, the shape of the trail of the chip member 20 can optionally be varied, if necessary. Thus, the rotation speed of the rotor 40 which is the driven mender can be controlled.

The inventors supposed that the system can be realized by a condition that the resonance frequency of actuator of the expansive vibration in the same phase mode coincides with that of the expansive vibration in the reverse phase mode. The same phase mode is defined that the phases of displacements of two piezoelectric devices coincide with each other. The opposite phase mode is defined that the phases of the displacements of two piezoelectric devices are opposite to each other. The analyzed results by finite element method will be described below.

FIGS. 9A to 9D respectively show the deformation of the actuator in the same phase mode and the opposite phase mode under a constraint condition. The constraint condition is defined that the rigidity of the base member 30 is higher and the base member 30 is hardly deformed by the displacements of the first piezoelectric device 10 and the second piezoelectric device 10'.

Figure 9A:
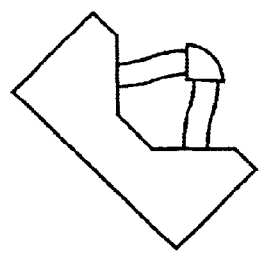
FIGS. 9A to 9D are schematic views for showing deformation of the actuator in the same phase mode and the opposite phase mode under a constraint condition.
Figure 9B:
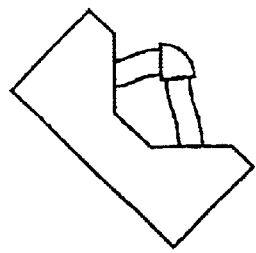
Figure 9C:
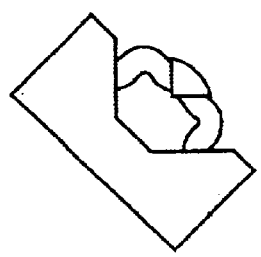
Figure 9D:
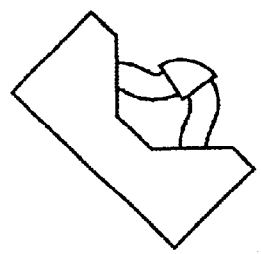

FIG. 9A shows the actuator in the resonance mode in which the expansive vibration occurs in the same phase mode. The frequency of the vibration is, for example, about 51 kHz. FIG. 9B shows the actuator in the resonance mode in which the expansive vibration occurs in the opposite phase mode. The frequency of the vibration is, for example, about 51 kHz. FIG. 9C shows the actuator in the resonance mode in which the bending vibration occurs in the same phase mode. The frequency of the vibration is, for example, about 157 kHz. FIG. 9D shows the actuator in the resonance mode in which the bending vibration occurs in the opposite phase mode. The frequency of the vibration is, for example, about 74 kHz. The frequency in each mode is defined by characteristics such as a material and a mass of each portion of the actuator.

FIGS. 10A to 10D respectively show the deformation of the actuator in the same phase mode and the opposite phase mode under a non-constraint condition. The non-constraint condition is defined that the rigidity of the base member 30 is lower and the base member 30 can be deformed by the displacements of the first piezoelectric device 10 and the second piezoelectric device 10'.

Figure 10A:
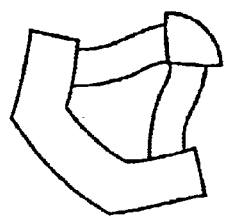
FIGS. 10A to 10D are schematic views for showing deformation of the actuator in the same phase mode and the opposite phase mode under a non-constraint condition.
Figure 10B:
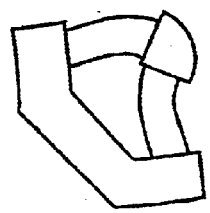
Figure 10C:
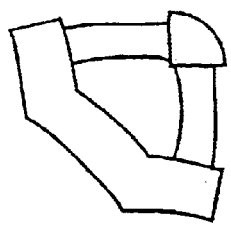
Figure 10D:
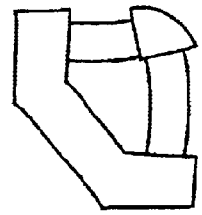

FIG. 10A shows the actuator in the resonance mode in which the expansive vibration occurs in the same phase mode. The frequency of the vibration is, for example, about 46 kHz. FIG. 10B shows the actuator in the resonance mode in which the expansive vibration occurs in the opposite phase mode. The frequency of the vibration is, for example, about 62 kHz. FIG. 10C shows the actuator in the resonance mode in which the bending vibration occurs in the same phase mode. The frequency of the vibration is, for example, about 79 kHz. FIG. 10D shows the actuator in the resonance mode in which the bending vibration occurs in the opposite phase mode. The frequency of the vibration is, for example, about 72 kHz.

In this embodiment, the actuator moves the chip member 20 by using the expansive vibrations of the first piezoelectric device 10 and the second piezoelectric device 10'. The deformations shown in FIGS. 9A, 9B, 10A and 10B are noticed. When the characteristics of the actuator were adjusted so as to coincide the frequency of the actuator in the same phase mode with that in the opposite phase mode, the trail of the chip member became substantially a circle. The above-mentioned supposition was supported.

Subsequently, conditions of the actuator for coinciding the frequencies in the same phase mode and in the opposite phase mode with each other will be described.

Figure 11:
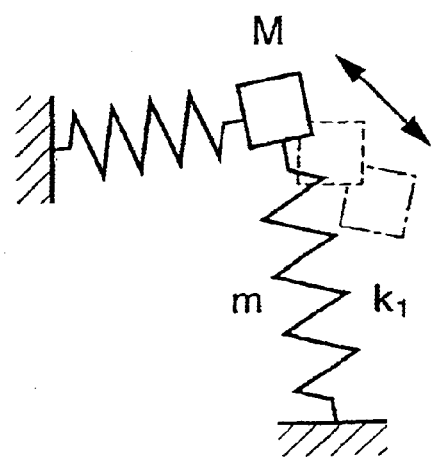
FIG. 11 is a schematic view for showing a model of the expansive vibration in the opposite phase mode under the constraint condition.

1. Modeling of the expansive vibration in the opposite phase mode under the constraint condition is described. The expansive vibration in the opposite phase mode can be regarded as an expansive vibration system configured by a spring with a mass and a weight as shown in FIG. 11. It, however, is difficult to obtain a natural frequency of the spring with a mass analytically, so that the Rayleigh method, which is generally used for supposing the deformation curve of a spring or a beam, is used approximately for obtaining the solution.

The mass of the spring in a unit length is designated by a symbol "$\mu$", a spring constant is designated by a symbol "k", a length of the spring is designated by a symbol "L". When an end of the spring is supported, the natural frequency of the expansive vibration is obtained as follows.

When it is assumed that a free end of the spring is vibrated as a simple harmonic motion in which the displacement of the free end is shown by $x(t) = X \cos \omega t$ and a displacement at a position distant a distance "y" from the free end $x_y(t)$ is in proportion to "y/L", the displacement $x_y(t)$ is shown by $x_y(t) = (y/L)\cos \omega t$. Thus, the kinetic energy Ek of the spring is shown by the following equations.

$$Ek = (\tfrac{1}{2})\int \mu (dx_y/dt)^2 dy$$

$$= (\tfrac{1}{2})\mu\omega^2 X^2 \sin^2 \omega t \int (y/L)^2 dy$$

$$= (\tfrac{1}{6})\mu L \omega^2 X^2 \sin^2 \omega t$$

On the other hand, the potential energy Ep of the spring is shown by the following equation.

$$Ep = (\tfrac{1}{2}) K x(t)^2 = (\tfrac{1}{2}) K X^2 \cos^2 \omega t$$

Since the largest value of the kinetic energy Ek of the spring is equal to that of the potential energy Ep of the spring by the energy method, the following equation is composed.

$$(\tfrac{1}{6})\mu L \omega^2 X^2 = (\tfrac{1}{2}) K X^2$$

Thus, the natural frequency "$\omega$" of the spring with the mass "m" is shown as follows.

$$\omega^2 = K/(\mu L/3) = K/(m/3)$$

On the contrary, the natural frequency of a spring with no mass and having the same spring constant is shown as $\omega_2 = K/M$, when an end of the spring is supported and a weight having a mass M is connected on the other end.

In other words, the natural frequency of the spring with a mass is equivalent to that of a system configured by a spring with no mass having the same spring constant and a weight having a mass of $\tfrac{1}{3}$ of the tare weight of the spring with a mass and connected on an end of the spring with no mass.

Subsequently, when a mass of the chip member is designated by a symbol "M", a mass of the piezoelectric device is designated by a symbol "m" ($m_1 = m/3$), a displacement at an end of the piezoelectric device is designated by a symbol "x", and a spring constant is designated by a symbol "$k_1$", the potential energy Ep and the kinetic energy Ek of the system are shown by the following equations.

$$Ep = (\tfrac{1}{2}) k_1 x^2 \times 2$$

$$Ek = (\tfrac{1}{2}) M (\sqrt{2} dx/dt)^2 + (\tfrac{1}{2}) m_1 (dx/dt)^2 \times 2$$

When $X(t) = X \cos \omega t$, and the energy method is used, it becomes $k_1 X^2 = M\omega^2 X^2 + m_1 \omega^2 X^2$.

Hereupon, when a tension, a stress, an elastic modulus and a strain of the piezoelectric device are respectively designated by symbols "T", "σ", "E" and "ε" the Hooke's law becomes as follows.

$$T=k_1X, \quad \sigma=E\epsilon$$

When a length and an area of a cross-section of the piezoelectric devices are designated by symbols "L" and "S", it becomes σ=T/S, and ε=x/L, so that $k_1$=SE/L. Thus, the frequency "$\omega_1$" of the expansion vibration in the opposite phase mode is shown by the following equation (1).

$$\omega_1^2 = k_1/(M+m_1) = SE/L(M+m/3) \quad (1)$$

Figure 12:
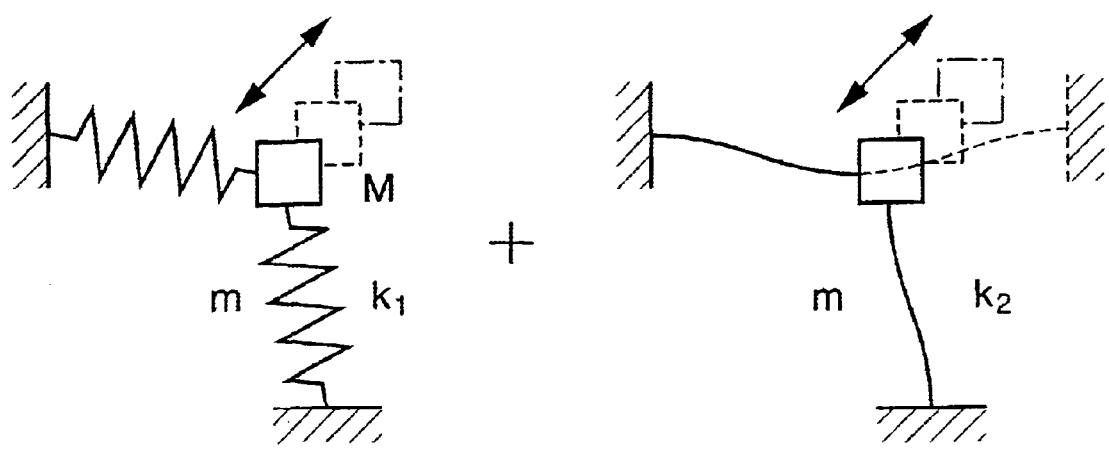
FIG. 12 is a schematic view for showing a model of the expansive vibration in the same phase mode under the constraint condition.

2. Modeling of the expansive vibration in the same phase mode under the constraint condition is described. The expansive vibration in the same phase mode can be regarded as a compounded system of an expansive vibration system configured by a spring with a mass and a weight and of a bending vibration system configured by a half of a beam both ends of which are supported, as shown in FIG. 12. The natural frequency of the compounded vibration system configured by a plurality of restoring elements and inertia elements can be supposed by compounding frequencies of respective independent systems (It corresponds to a method for compounding vibration frequencies). Since the restoring elements are connected in parallel with each other and the inertia elements are connected in series, the natural frequency of the compounded system can be obtained by addition of the spring constants and the masses of the independent systems.

Since the expansive vibration in the same phase mode is the same as that in the opposite phase mode, so that the natural frequency "$\omega_2$" of the compounded system is shown by the following equation, when the spring constant in the bending vibration is designated by a symbol "$k_2$" and an equivalent mass thereof is designated by a symbol "$m_2$".

$$\omega_2^2 = (k_1+k_2)/(M+m_1+m_2)$$

When a density, an area of a cross-section, a bending rigidity and a length of a beam with a mass are respectively designated by symbols "ρ", "S", "EI" and "L", and when both ends of the beam are supported, a natural frequency of the bending vibration of the beam can be obtained as follows.

The potential energy Ep and the kinetic energy Ek of the beam in the bending vibration are shown by the following equations.

$$Ep=(\tfrac{1}{2})\int EI(d^2y/dx^2)^2 dx$$

$$Ek=(\tfrac{1}{2})\int \rho S(dy/dt)^2 dx$$

When a static strain curve of the beam is designated by Y(x), and the vibration is assumed to be shown by y(x,t)=Y(x)cos ωt, the above-mentioned equations are modified to be the following equations.

$$Ep=(\tfrac{1}{2})EI\cos^2\omega t\int (d^2Y(x)/dx^2)^2 dx$$

$$Ek=(\tfrac{1}{2})\rho S\omega^2\cos^2\omega t\int Y(x)^2 dx$$

Furthermore, when both ends of the beam are supported and the beam receives a load evenly distributed, the strain curve Y(x) is shown by the following equation.

$$Y(x)=(\rho S/24EI)x^2(L-x)^2$$

This Y(x) is substituted into the above-mentioned equations of the potential energy Ep and the kinetic energy Ek.

$$Ep=(\tfrac{1}{2})EI\cos^2\omega t(\rho S/24EI)^2\int(12x^2-12Lx+2L^2)dx=(\tfrac{1}{2})EI\cos^2\omega t(\rho S/24EI)^2\times(\tfrac{4}{5})L^5$$

$$Ek=(\tfrac{1}{2})\rho S\omega^2\cos^2\omega t(\rho S/24EI)^2\int x^4(L-x)^4 dx=(\tfrac{1}{2})\rho S\omega^2\cos^2\omega t(\rho S/24EI)^2(\tfrac{1}{630})L^9$$

Thus, the natural frequency of the beam both ends of which are supported and having a mass "m" is shown by the following equation.

$$\omega^2 = 4\times 630EI/5\rho SL^4 = 504EI/mL^3$$

On the other hand, when a weight with a mass M is connected at the center of the beam both ends of which are supported, the displacement "y" can be shown as y=MgL³/192EI. The natural frequency "ω" of the beam is shown by the following equation.

$$\omega^2 = K/L = 192EI/ML^3$$

Thus, the natural frequency of the beam with a mass is equivalent to that of a system configured by a beam with no mass and having the same bending rigidity and a weight connected at the center of the beam with no mass and having a weight of 192/504≈1/2.63 of the tare weight of the beam with a mass. When L'=L/2 and M'=M/2, since the displacements "y" are equal, it becomes $$y=MgL^3/192EI=(2M')g(2L')^3/192EI=M'gL'^3/12EI.$$

Thus, a spring constant "$K_2$" and an equivalent mass "$m_2$" of a vibration system by the half of the beam both ends of which are supported are shown by the following equations.

$$K_2=12EI/L'^3, \text{ and } m_2=m/2.63$$

As a result, the frequency "$\omega_2$" of the expansive vibration in the same phase mode can be shown by the following equation (2).

$$\omega_2^2=(SE/L+12EI/L^3)/(M+m/3+m/2.63) \quad (2)$$

3. A condition for making the trail of the chip member be circular is described below. As mentioned above, it is necessary to coincide the frequency "$\omega_1$" of the expansive vibration in the same phase mode with the frequency "$\omega_2$" of the expansive vibration in the opposite phase mode. That is, the following equation will be composed.

$$SE/L(M+m/3)=(SE/L+12EI/L^3)/(M+m/3+m/2.63)$$

Hereupon, the equation is simplified by using S=W×H, and I=WH³/12. The symbols "W" and "H" respectively designate the width and the height of the piezoelectric device. The condition that the frequencies "$\omega_1$" and "$\omega_2$" coincide with each other is shown by the following equation (3).

$$M=(L^2/H^2-0.88)\times m/2.63 \quad (3)$$

It is found that the most suitable mass "M" of the chip member becomes larger, even when the mass "m" of the piezoelectric device is the same but a ratio of the width and the height in a cross-section of the piezoelectric device is larger.

Figure 13A:
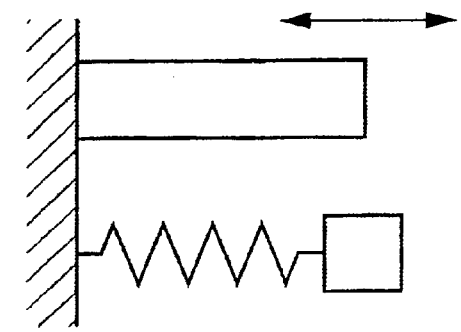
FIGS. 13A and 13B are schematic views for showing a model of the expansive vibration in the opposite phase mode under the non-constraint condition.
Figure 13B:
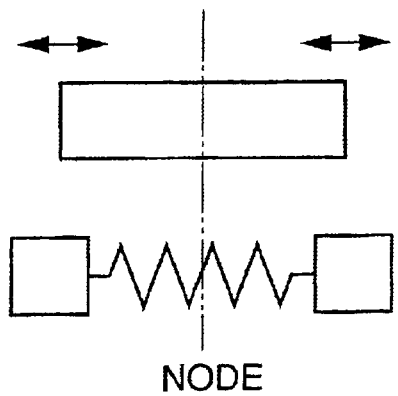

4. Modeling of the expansive vibration in the opposite phase mode under the non-constraint condition is described. When the base member is not constrained, it is necessary to found a node of a vibration which serves as a standard point for obtaining the natural frequency of the actuator. The node is a point where no displacement occurs even when an objective member to be solved is vibrated. The frequencies of both sides of the node coincide with each other in the resonance vibration. A first system in which an end of the piezoelectric device is constrained is shown in FIG. 13A. A second system in which both ends of the piezoelectric device are constrained is shown in FIG. 13B. In the first system shown in FIG. 13A, the constrained end of the piezoelectric device becomes the node of the vibration. In the second system shown in FIG. 13B, the node is positioned on a center axis of the piezoelectric device, and the frequencies of both sides of the node coincide with each other. In comparison with the first system and the second system, the spring constant becomes double and the mass becomes half in the second system than those in the first system, so that the frequency in the second system becomes double that than in the first system.

Figure 14A:
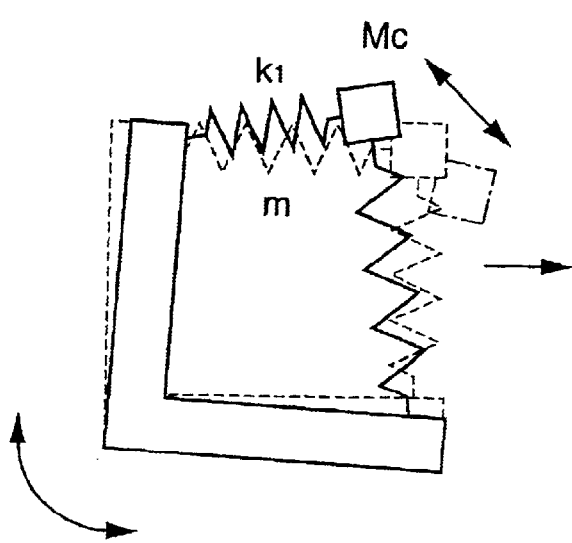
FIGS. 14A and 14B are schematic views for showing a model of the expansive vibration in the opposite phase mode under the non-constraint condition.
Figure 14B:
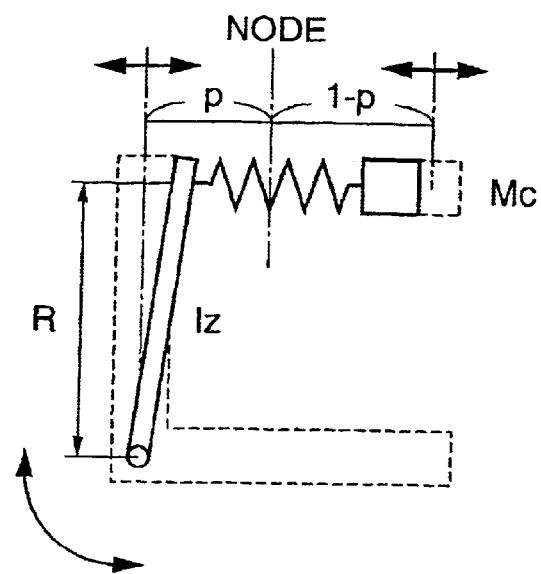

Subsequently, the expansive vibration in the opposite phase mode is shown in FIGS. 14A and 14B. In FIG. 14A, a piezoelectric device disposed substantially horizontal is noticed. The left end of the piezoelectric device is supported on a base member and a chip member is connected to the right end of the piezoelectric device. As shown in FIG. 14B, the base member can be regarded as a rotatable rod. Furthermore, an effect owing to another piezoelectric device disposed substantially vertical in FIG. 14A can be disregarded. Thus, the vibration system can be shown by a system configured by a spring with a mass and a weight as shown in FIG. 14B.

When a mass of the piezoelectric device is designated by a symbol "m", a spring constant of the expansive vibration is designated by a symbol "$k_1$", and a ratio of a length between the end at the base member side to the node with respect to the total length of the piezoelectric device is designated by a symbol "p" ($0 \leq p \leq 1$), a mass "$m_L$" and a spring constant "$k_L$" in the left side of the vibration system from the node, and a mass "$m_R$" and a spring constant "$k_R$" in the right side of the vibration system from the node are shown by the following equations.

$$m_L = pm, \; k_L = k_1/p$$

$$m_R = (1-p)m, \text{ and } k_R = k_1/(1-p)$$

Furthermore, when a mass of the chip member is designated by a symbol "$M_c$", a half of a moment of inertia of the base member is designated by a symbol "$I_z$", a radius of rotation of the base member is designated by a symbol "R", a displacement in the left side of the vibration system from the node is designated by a symbol "$x_L$" and a displacement in the right side of the vibration system from the node is designated by a symbol "$x_R$", the energies are shown by the following equations.

$$(\tfrac{1}{2})k_L x_L^2 = (\tfrac{1}{2})I_z(d(x_L/R)/dt)^2 + (\tfrac{1}{2})(m_L/3)(dx_L/dt)^2$$

$$(\tfrac{1}{2})k_R x_R^2 = (\tfrac{1}{2})M_c(dx_R/dt)^2 + (\tfrac{1}{2})(m_R/3)(dx_R/dt)^2$$

Hereupon, $x_L = x_L \cos \omega t$ and $x_R = x_R \cos \omega t$ are assumed and substituted in the above-mentioned equations, the frequencies "$\omega_L$" in the left side and "$\omega_R$" in the right side of the vibration system are shown by the following equations (4).

$$\omega_L^2 = (k_1/p)/(I_z/R^2 + pm/3)$$

$$\omega_R^2 = (k_1/(1-p))/(M_c + (1-p)m/3) \tag{4}$$

Since the frequencies "$\omega_L$" and "$\omega_R$" are the same with respect to the node in the resonance vibration, so that the equations (4) can be deformed as the following equation.

$$(k_1/p)/(I_z/R^2 + pm/3) = (k_1/(1-p))/(M_c + (1-p)m/3)$$

Thus, the position of the node can be obtained by the following equation (5).

$$p = (M_c + m/3)/(M_c + I_z/R^2 + 2m/3) \tag{5}$$

When the position "p" obtained from the equation (5) is substituted into the equation (4), the natural frequency of the actuator in the opposite phase mode can be obtained.

Figure 15A:
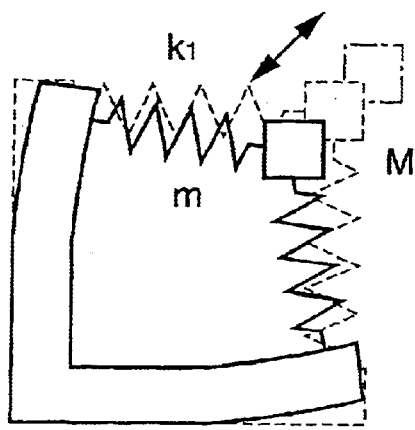
FIGS. 15A to 15C are schematic views for showing a model of the expansive vibration in the same phase mode under the non-constraint condition.
Figure 15B:
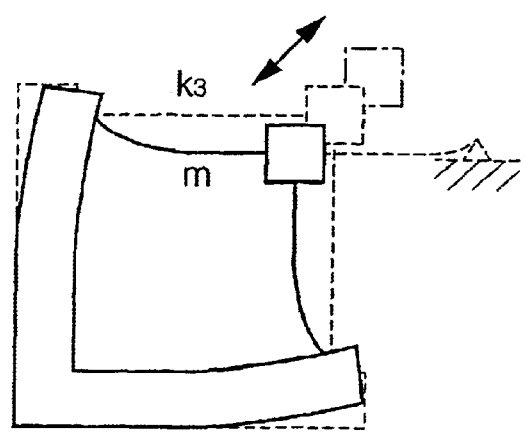
Figure 15C:
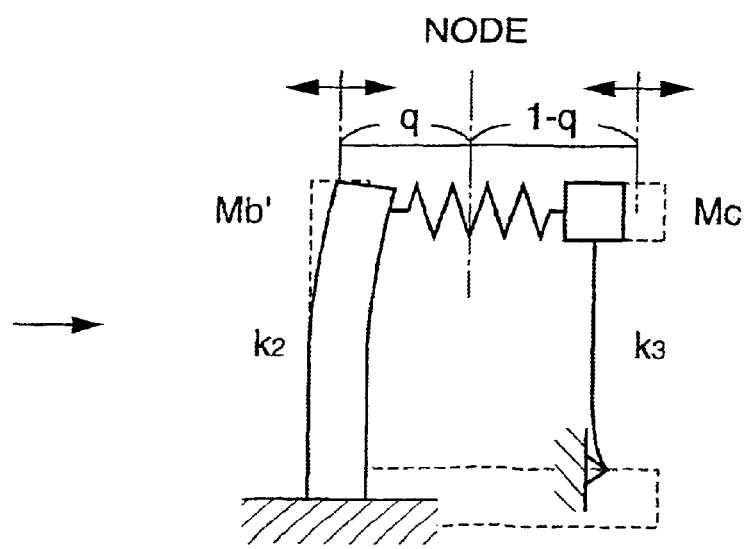

5. Modeling of the expansive vibration in the same phase mode under the non-constraint condition is described. The expansive vibration in the same phase mode is shown in FIGS. 15A to 15C. In FIG. 15A, a piezoelectric device disposed substantially horizontal is noticed. The left end of the piezoelectric device is supported on a base member, a chip member is connected to the right end of the piezoelectric device, and another piezoelectric device is further provided between the chip member and the base member. The base member can be regarded as a cantilever bottom of which is supported. Each piezoelectric device can be regarded as a half of a beam both ends of which are supported.

When a ratio of lengths of the piezoelectric devices are designated by a symbol "q" ($0 \leq q \leq 1$), a spring constant of the bending vibration is designated by a symbol "$k_2$", an equivalent mass of the base member is designated by a symbol "$M_b'$", and a spring constant of a bending deformation of the piezoelectric device is designated by a symbol "$k_3$", the frequencies "$\omega_L$" in the left side and "$\omega_R$" in the right side of the vibration system are shown by the following equations (6).

$$\omega_L^2 = (k_1/q + k_2)/(M_b' + qm/3)$$

$$\omega_R^2 = (k_1/(1-q) + k_3)/(M_c + (1-q)m/3 + m/2) \tag{6}$$

Since the frequencies "$\omega_L$" and "$\omega_R$" are the same with respect to the node in the resonance vibration, so that the equations (6) can be deformed as the following equation (7).

$$(k_1/q + k_2)/(M_b' + qm/3) = (k_1/(1-q) + k_3)/(M_c + (1-q)m/3 + m/2) \tag{7}$$

The above-mentioned equation (7) is a cubic equation with respect to "q", so that it is generally difficult to solve the equation. When a suitable value is substituted into "q" in a range of $0 \leq q \leq 1$, it is found that the equation (7) can be approximated by the following equation (8). A symbol "N" designates a constant.

$$M_c + 5m/6 \approx qN/(1-q) \tag{8}$$

The value "N" is obtained by deforming the equation (8).

$$N = (M_b' + mq/3) \times (k_1 + (1-q)k_3)/(k_1 + k_2 q) + m(1-q)/3$$

When it is assumed that $k_1 \gg k_2$ and $k_3$, the above-mentioned equation becomes as the following equation.

$$N \approx (M_b' + mq/3) + m(1-q)/3$$

$$= M_b' + m/3$$

When the value of "N" is substituted into the equation (8), the position of the node in the same phase mode can be obtained by the following equation (9).

$$q = (M_c + 5m/6)/(M_c + 5m/6 + M_b' + m/3)$$

$$= (M_c + 5m/6)/(M_c + M_b' + 7m/6) \quad (9)$$

When the position "q" obtained from the equation (9) is substituted into the equation (6), the natural frequency of the actuator in the same phase mode can be obtained.

MODIFICATIONS

The piezoelectric device is electrically equivalent to a capacitor. When the frequency of the driving signals becomes close to the resonance frequency, the phase difference between the phase of the voltage of the driving signals supplied to the piezoelectric device and the phase of the current flowing in the piezoelectric device varies. The displacement of the piezoelectric device can be regarded to be equivalent to the current flowing therein. Thus, when there is a difference between the resonance frequencies of two piezoelectric devices, the phase difference between the driving signals cannot be reflected to the trail of the chip member accurately. Furthermore, a difference occurs between the displacements of the piezoelectric devices corresponding to the frequency of the driving signals. Thus, the trail of the chip member cannot be formed as the desired shape.

For solving these problems, the currents flowing in the mechanical arms of two piezoelectric devices are sensed, and the amplitude of the voltage of the driving signals are controlled so that the amplitudes of the vibration of the piezoelectric devices are the same. Furthermore, the phase difference of the voltages of the driving signals is controlled so that the phase difference between the phases of the currents flowing in the piezoelectric devices are to be a predetermined value, for example, 90 degrees. As a result, the trail of the chip member can be controlled to be a desired elliptic or circular shape.

Figure 16:
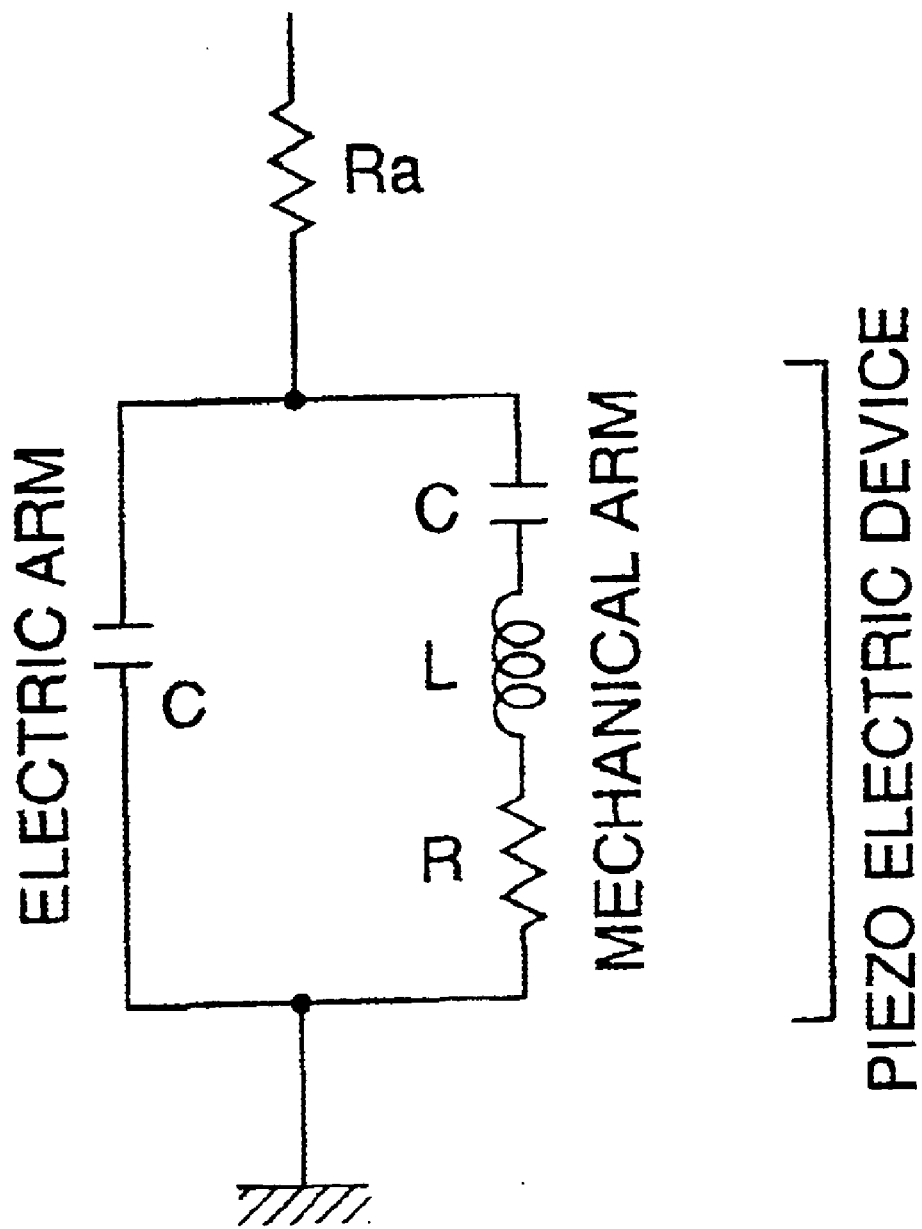
FIG. 16 is a schematic view for showing an equivalent circuit of the piezoelectric device.

An equivalent circuit of the piezoelectric device is shown in FIG. 16. The displacement of the piezoelectric device is in proportion to a value of a current flowing in the mechanical arm. However, the value of the current is actually sensed from a voltage between both ends of the resistor "Ra", so that it is necessary to subtract a value of the current flowing in the electric arm from the value sensed by the resistor "Ra". A capacitance "C" of the electric arm can be measured previously, and the value of the capacitance "C" can be regarded as constant. Since the value of the current flowing in the electric arm can be known from the voltage of the driving signals applied to the piezoelectric device, the value of the current flowing in the mechanical arm can be known by subtracting the value of the current flowing in the electric arm from the value of the current flowing in the resistor "Ra".

Figure 17:
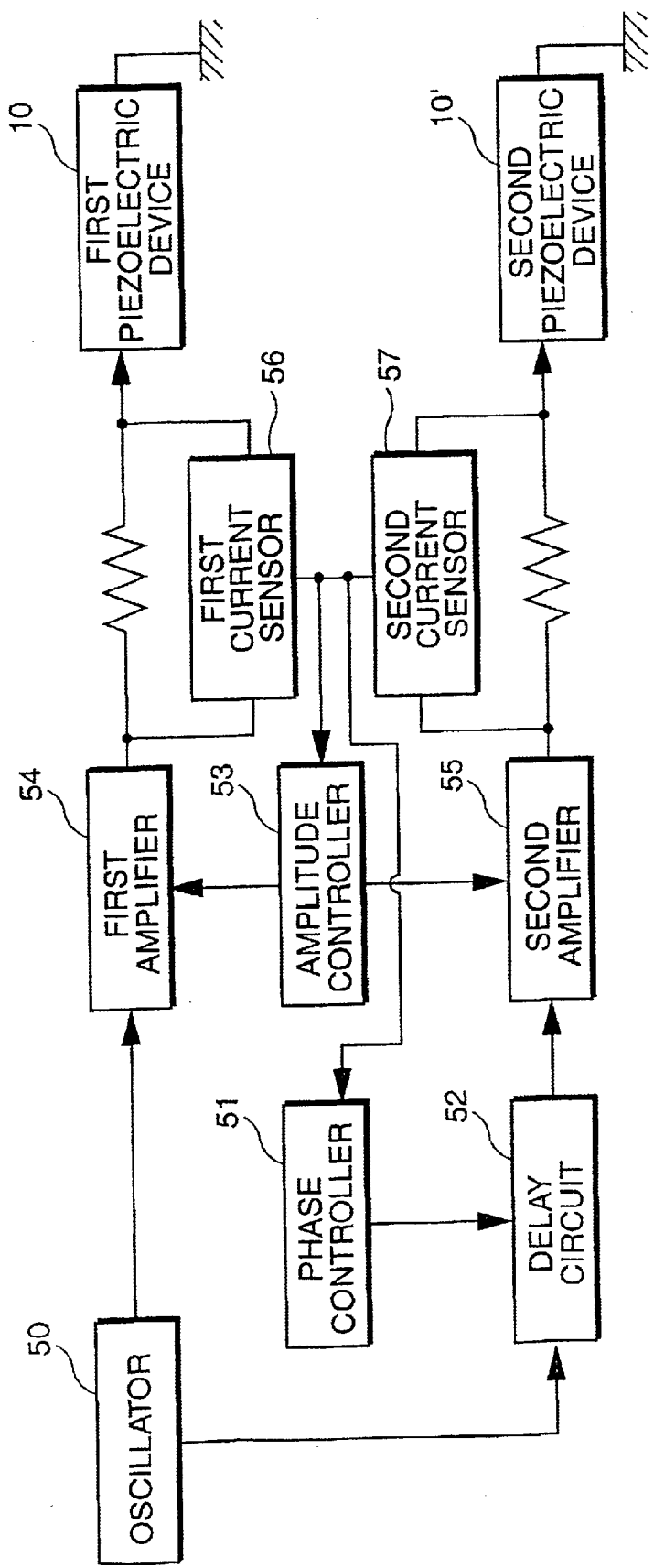
FIG. 17 is a block diagram for showing a configuration of a modified driving circuit of the actuator in this embodiment.

A block diagram of a modified driving circuit is shown in FIG. 17. An oscillator 50 generates sine wave signals having a predetermined frequency. The frequency of the sine wave signals is variable corresponding to the variation of the resonance frequency due to the variation of the circumstances. A phase controller 51 controls a delay circuit 52 corresponding to rotation speed, driving torque, rotation direction of the rotor 40 so as to generate sine wave signals having a predetermined phase difference. An amplitude controller 53 controls a first amplifier 54 and a second amplifier 55 for amplifying two sine wave signals having a phase difference. The amplified sine wave signals by the first amplifier 54 and the second amplifier 55 are respectively applied to the first piezoelectric device 10 and the second first piezoelectric device 10'. A second current sensor 56 senses a value of a current flowing in the mechanical arm of the first piezoelectric device 10. A second current sensor 57 senses a value of a current flowing in the mechanical arm of the second piezoelectric device 10'. The sensing results of the first current sensor 56 and the second current sensor 57 are inputted to the phase controller 51 and the amplitude controller 53. The phase controller 51 further detects a phase difference between the phase of the current flowing in the mechanical arm of the first piezoelectric device 10 and the phase of the current flowing in the mechanical arm of the second piezoelectric device 10' from the signals from the first current sensor 56 and the second current sensor 57, and controls the delay circuit 52 so that the phase difference between the currents becomes a predetermined value. The amplitude controller 53 further detects an amplitude of the current flowing in the mechanical arm of the first piezoelectric device 10 and an amplitude of the current flowing in the mechanical arm of the second piezoelectric device 10' from the signals from the first current sensor 56 and the second current sensor 57, and controls the first amplifier 54 and the second amplifier 55 so that the amplitudes of the currents become predetermined values.

Figure 18A:
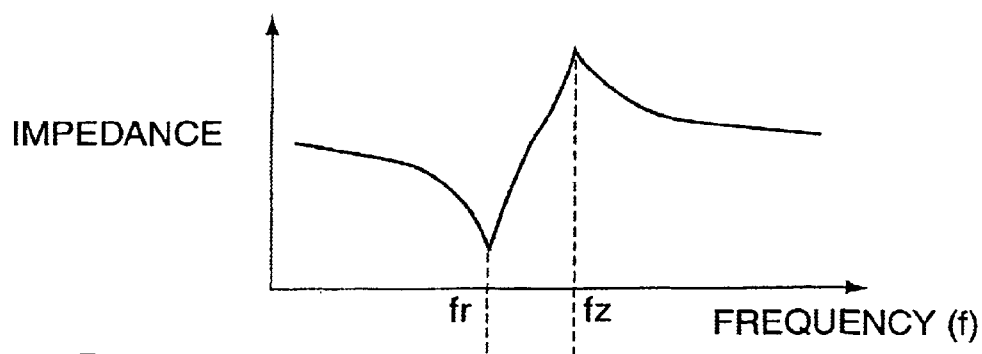
FIGS. 18A to 18C are graphs for showing resonance characteristics of the piezoelectric device.
Figure 18B:
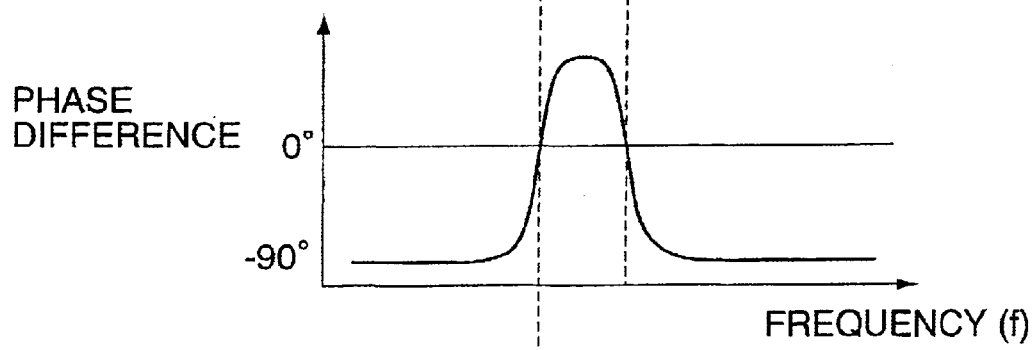
Figure 18C:
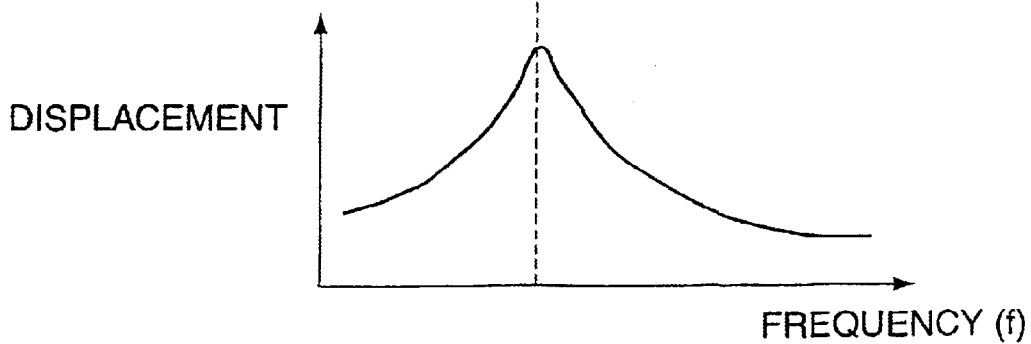

Subsequently, the resonance characteristics of the piezoelectric device are described. FIG. 18A shows a relation between the variation of the impedance of the piezoelectric device and the frequency of the driving signals. Hereinafter, the frequency of the driving signals is abbreviated as "frequency". FIG. 18B shows the phase difference between the phase of the current flowing in the mechanical arm of the piezoelectric device and the frequency. FIG. 18C shows a relation between the displacement of the piezoelectric device and the frequency. In FIGS. 18A to 18C, the abscissa shows the frequency "f".

In the figures, it is noticed from the left side to the right side. When the frequency is gradually increased, the impedance of the piezoelectric device decreases and the displacement of the piezoelectric device increases corresponding to the increase of the frequency. With respect to the phase difference between the phase of the voltage of the driving signals and the phase of the current flowing in the mechanical arm (hereinafter, abbreviated as "phase difference between the voltage and the current"), the phase of the current generally advances 90 degrees. However, when the frequency "f" approaches to the resonance frequency "$f_r$", the phase difference between the voltage and the current abruptly decreases. When the frequency "f" reaches to the resonance frequency "$f_r$", the impedance of the piezoelectric device becomes the smallest value, and the phase difference between the voltage and the current becomes "0". Furthermore, the displacement of the piezoelectric device becomes the largest.

When the frequency "f" becomes a little larger than the resonance frequency "$f_r$", the impedance of the piezoelectric device abruptly increases, and the phase of the current becomes to be delayed from the phase of the voltage. The displacement of the piezoelectric device becomes gradually smaller than the largest value at the resonance frequency "$f_r$". When the frequency "f" becomes larger, the phase difference between the voltage and the current becomes substantially constant in a frequency band. Hereinafter, the frequency band in which the phase difference between the voltage and the current becomes substantially constant is called "stable frequency band".

When the frequency "f" becomes much larger, the phase difference between the voltage and the current decreases. When the frequency "f" reaches to the antiresonance frequency "$f_z$", the phase difference between the voltage and the current becomes "0". Simultaneously, the impedance of the piezoelectric device becomes the largest value. When the frequency "f" becomes larger than the antiresonance frequency "$f_z$", the impedance of the piezoelectric device gradually decreases, and the phase of the current advances than the phase of the voltage. The phase difference between the voltage and the current will be stabilized in a state that the phase of the current advances 90 degrees than the phase of the voltage.

As mentioned above, the phase difference between the phase of the voltage of the driving signals and the phase of the current flowing in the mechanical arm is abruptly varied in the vicinity of the resonance frequency "$f_r$".

Figure 20A:
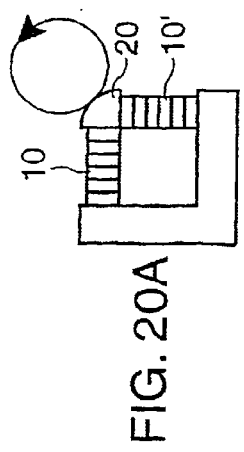
FIGS. 20A to 20C are schematic views for showing examples of trails of the chip member due to error components of the piezoelectric devices.
Figure 21A:
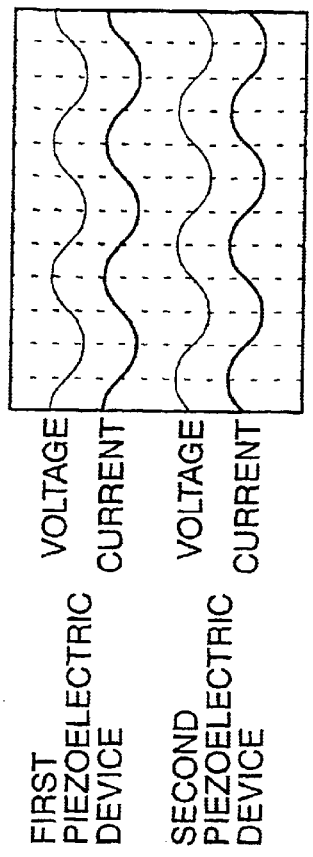
FIGS. 21A to 21C are graphs for showing waveforms of driving signals and currents flowing in the piezoelectric devices.

Subsequently, an example for driving the actuator so as to move the chip member 20 along a circular trail is considered. When the resonance frequency of the first piezoelectric device 10 coincides with that of the second piezoelectric device 10' and the impedance of them are substantially the same, the displacement and the phases of the voltage and the current of the first piezoelectric device 10 are varied similar to those of the second piezoelectric device 10' even when the frequency of the driving signals is varied in the vicinity of the resonance frequency. Thus, when the frequency of the driving signals is set to be the same as the resonance frequency of the piezoelectric devices, the amplitudes of the voltages of the driving signals applied to the first piezoelectric device 10 and the second piezoelectric device 10' are set to be the same, and the phase difference between the driving signals applied to the first piezoelectric device 10 and the second piezoelectric device 10' is maintained to be 90 degrees, the trail of the chip member 20 can be made circular having the largest diameter as shown in FIG. 20A. The waveforms of the voltages of the driving signals and the currents flowing in the first piezoelectric device 10 and the second piezoelectric device 10' are shown in FIG. 21A.

Figure 19A:
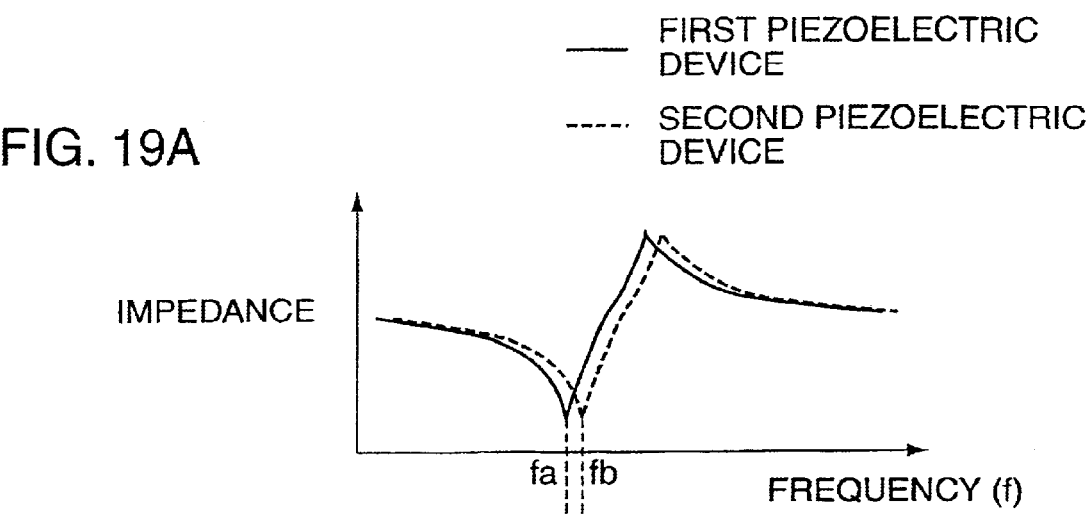
FIGS. 19A to 19C are graphs for showing an example of resonance characteristics of two different piezoelectric devices.
Figure 19B:
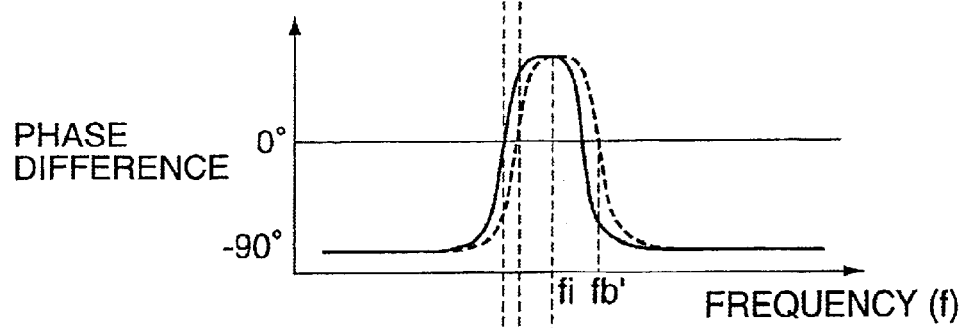
Figure 19C:
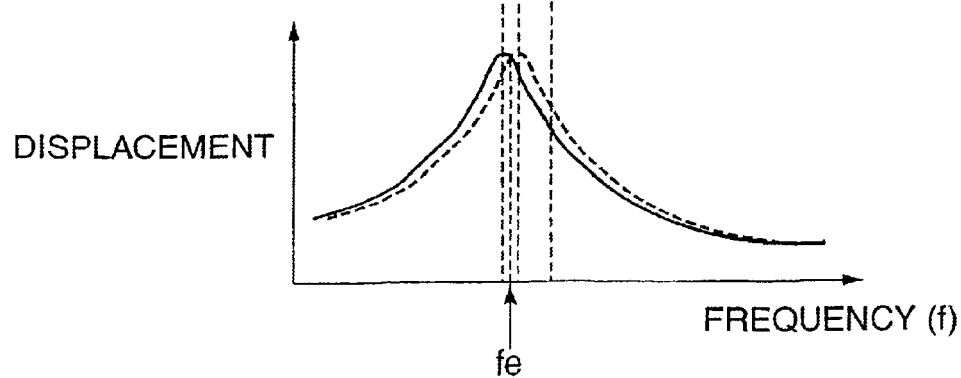

The resonance frequencies and the impedance characteristics of the first piezoelectric device 10 and the second piezoelectric device 10', however, are not necessarily the same, because of the variation and the error components in the manufacturing process of the piezoelectric devices and in the assembling process of the actuator. FIGS. 19A to 19C show the resonance characteristics of two piezoelectric devices respectively having different resonance frequencies and the impedance characteristics. FIG. 19A corresponds to FIG. 18A, FIG. 19B corresponds to FIG. 18B, and FIG. 19C corresponds to FIG. 18C. In FIGS. 19A to 19C, the characteristic curves illustrated by solid lines show the resonance characteristics of the first piezoelectric device 10, and the characteristic curves illustrated by dotted lines show the resonance characteristics of the second piezoelectric device 10'.

In the figures, the resonance frequency "$f_a$" of the first piezoelectric device 10 is noticed. The phase difference of the voltage and the current with respect to the first piezoelectric device 10 is "0". On the other hand, the frequency "$f_a$" is smaller than the resonance frequency "$f_b$" of the second piezoelectric device 10'. The phase of the current advances about 60 degrees than the frequency of the voltage with respect to the second piezoelectric device 10'.

Figure 20B:
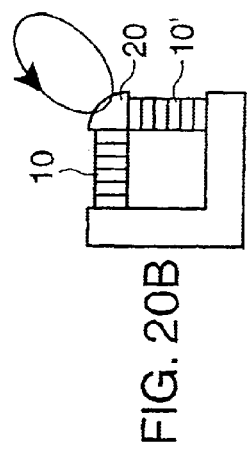
Figure 21B:
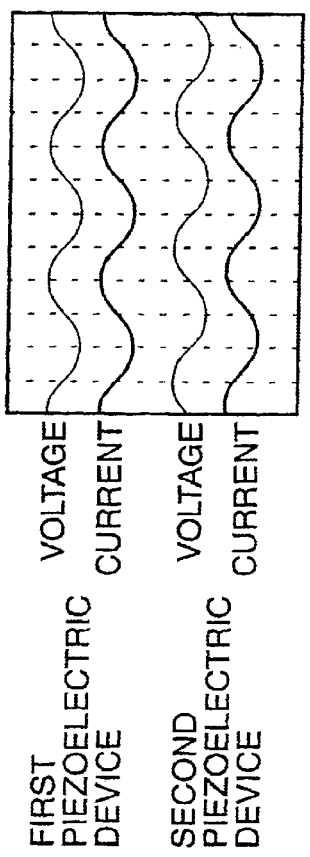

When the driving signals having the waveforms shown by "VOLTAGE" in FIG. 21B, in which the phase of the driving signal applied to the first piezoelectric device 10 advances 90 degrees than that applied to the second piezoelectric device 10', are applied to the first piezoelectric device 10 and the second piezoelectric device 10'having the above-mentioned resonance characteristics, the phase difference between the phase of the current flowing in the mechanical arm of the first piezoelectric device 10 and that of the second piezoelectric device 10' becomes about 30 degrees. Thus, the trail of the chip member 20 becomes an ellipse having the major axis parallel to the symmetry axis of the actuator as shown in FIG. 20B.

Figure 20C:
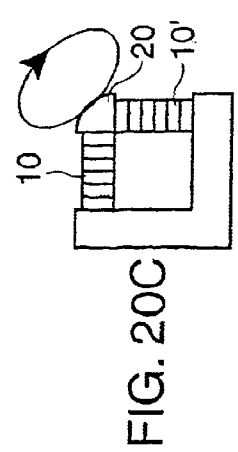
Figure 21C:
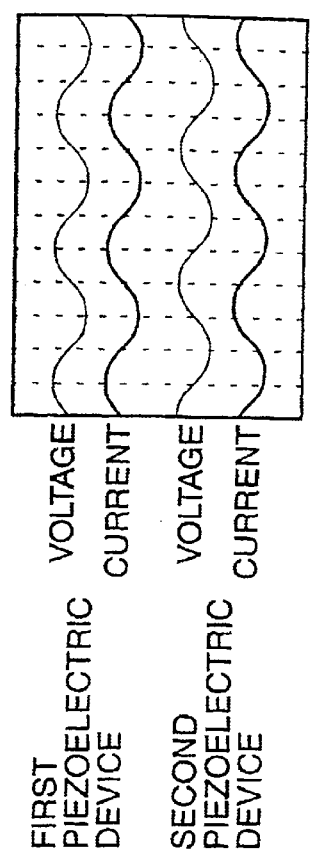

On the contrary, when the driving signals having the waveforms shown by "VOLTAGE" in FIG. 21C, in which the phase of the driving signal applied to the second piezoelectric device 10'advances 90 degrees than that applied to the first piezoelectric device 10, are applied to the first piezoelectric device 10 and the second piezoelectric device 10', the phase difference between the phase of the current flowing in the mechanical arm of the first piezoelectric device 10 and that of the second piezoelectric device 10' becomes about 150 degrees. Thus, the trail of the chip member 20 becomes an ellipse having the minor axis parallel to the symmetry axis of the actuator as shown in FIG. 20C. As a result, the rotation speed of the chip member 20 or the rotor 40 is different corresponding to the rotation directions.

For solving this problem, a first method is proposed for driving the first piezoelectric device 10 and the second piezoelectric device 10' by driving signals having a frequency "$f_i$" at which the phase difference of the voltage and the current with respect to the first piezoelectric device 10 coincides with the phase difference of the voltage and the current with respect to the second piezoelectric device 10'. As mentioned above, the stable frequency band in which the phase difference between the voltage and the current becomes substantially constant and stable is exist between the resonance frequency and the antiresonance frequency of the piezoelectric devices. When FIG. 19B is noticed, it is found that the stable frequency band with respect to the first piezoelectric device 10 overlaps the stable frequency band with respect to the second piezoelectric device 10' in the vicinity of the frequency "$f_i$".

Thus, when the driving signals having the frequency of the driving signals "$f_i$" and the phase difference of 90 degrees are applied to the first piezoelectric device 10 and the second piezoelectric device 10', the phase difference between the phase of the current flowing in the mechanical arm of the first piezoelectric device 10 and that of the second piezoelectric device 10' can be made 90 degrees. Since the resonance frequency "$f_a$" of the first piezoelectric device 10 is different from the resonance frequency "$f_b$" of the second piezoelectric device 10', the displacement of the first piezoelectric device 10 is a little different from the displacement of the second piezoelectric device 10'. In comparison with a case for driving the first piezoelectric device 10 and the second piezoelectric device 10' by driving signals having the resonance frequency "$f_a$" or "$f_b$" of any piezoelectric device, the difference between the displacement of the first piezoelectric device 10 and the displacement of the second piezoelectric device 10' is smaller (see FIG. 19C). Thus, the trail of the chip member 20 can be made substantially circular, and there is no problem in the actual use.

A block diagram of the driving circuit suitable for the first method is shown in FIG. 22. An oscillator 50 generates sine wave signals having a predetermined frequency. The frequency of the sine wave signals is variable. A delay circuit 52 generates sine wave signals the phase of which is delayed at a predetermined angle such as 90 degrees with respect to the sine wave signals from the oscillator 50. A first amplifier 54 and a second amplifier 55 amplify two sine wave signals having the phase difference, and apply the amplified sine wave signals to the first piezoelectric device 10 and the second piezoelectric device 10'. A first current sensor 56 senses a value of a current flowing in the mechanical arm of the first piezoelectric device 10. A second current sensor 57 senses a value of a current flowing in the mechanical arm of the second piezoelectric device 10'. The sensing results of the first current sensor 56 and the second current sensor 57 are inputted to the oscillator 50. The oscillator 50 searches the overlapped band of the stable frequency band with respect to the first piezoelectric device 10 and the stable frequency band with respect to the second piezoelectric device 10' from the current signals from the first current sensor 56 and the second current sensor 57. Furthermore, the oscillator 50 decides the frequency "$f_i$" of the driving signals. When the frequency "$f_i$" of the driving signals is decided, the oscillator 50 continues to oscillate the sine wave signals at the frequency "$f_i$".

As a method for deciding the frequency "$f_i$" of the driving signals, the frequency of the oscillation of the oscillator 50 is gradually varied and the resonance frequency "$f_a$" of the first piezoelectric device 10 and the antiresonance frequency "$f_b'$" of the second piezoelectric device 10' are detected from the current signals from the first current sensor 56 and the second current sensor 57 and the voltage of the driving signals. The frequency "$f_i$" of the driving signals is decided to be the center value between the resonance frequency "$f_a$" of the first piezoelectric device 10 and the antiresonance frequency "$f_b'$" of the second piezoelectric device 10'. Alternatively, the frequencies in the vicinity of the frequency at which the phase difference of the voltage and the current with respect to the first piezoelectric device 10 are compared with those with respect to the second piezoelectric device 10' by varying the frequency of the oscillation of the oscillator 50. The frequency "$f_i$" of the driving signals is selected to be one of the frequency commonly included in the frequencies with respect to the first piezoelectric device 10 and the frequencies with respect to the second piezoelectric device 10'.

When the driving circuit shown in FIG. 22 is compared with the driving circuit shown in FIG. 17, the phase controller 51 and the amplitude controller 53 are not necessary, so that the configuration of the driving circuit can be simplified. Furthermore, the amplitude of the voltage and the phase difference of the driving signals are not adjusted, so that the control of the actuator can be simplified.

Also, the phase difference of the voltage and the current is stable in the vicinity of the frequency "$f_i$". Thus, it is possible to maintain the shape of the trail of the chip member by driving the piezoelectric devices continuously at a predetermined frequency "$f_i$" of the driving signals, since the variation of the phase difference between the voltage and the current is smaller when the variation of the resonance frequencies of the piezoelectric devices due to the variation of circumstances is small. In this case, the adjustment of the frequency of the oscillation by the oscillator 50 and the detection of the currents by the first current sensor 56 and the second current sensor 57 can be omitted, and the configuration of the driving circuit can be made more simple.

Subsequently, a second method for solving the above-mentioned problem is proposed for driving the first piezoelectric device 10 and the second piezoelectric device 10' by driving signals having a frequency "$f_e$" between the resonance frequency "$f_a$" of the first piezoelectric device 10 and the resonance frequency "$f_b$" of the second piezoelectric device 10', at which the displacement of the first piezoelectric device 10 coincides with the displacement of the second piezoelectric device 10'. As mentioned above, the displacement of the piezoelectric device becomes the largest value when the frequency of the driving signal coincides with the resonance frequency of the piezoelectric device, but it decreases when the frequency of the driving signal is a little larger or smaller than the resonance frequency. Thus, the frequency "$f_e$" at which the displacement of the first piezoelectric device 10 coincides with the displacement of the second piezoelectric device 10' exists in a frequency band between the resonance frequency "$f_a$" of the first piezoelectric device 10 and the resonance frequency "$f_b$" of the second piezoelectric device 10'. The currents flowing in the mechanical arms of the first piezoelectric device 10 and the second piezoelectric device 10' are sensed and the frequency "$f_e$" at which the current values becomes the same is found. The first piezoelectric device 10 and the second piezoelectric device 10' are driven by the driving signals having the frequency "$f_e$". In this case, since the frequency "$f_e$" of the driving signals is different from the resonance frequency "$f_a$" of the first piezoelectric device 10 and the resonance frequency "$f_b$" of the second piezoelectric device 10', it is necessary to adjust the phase difference of the voltages of the driving signals so that the phase difference between the phase of the current flowing in the mechanical arm of the first piezoelectric device 10 and the phase of the current flowing in the mechanical arm of the second piezoelectric device 10' becomes 90 degrees.

Figure 23:
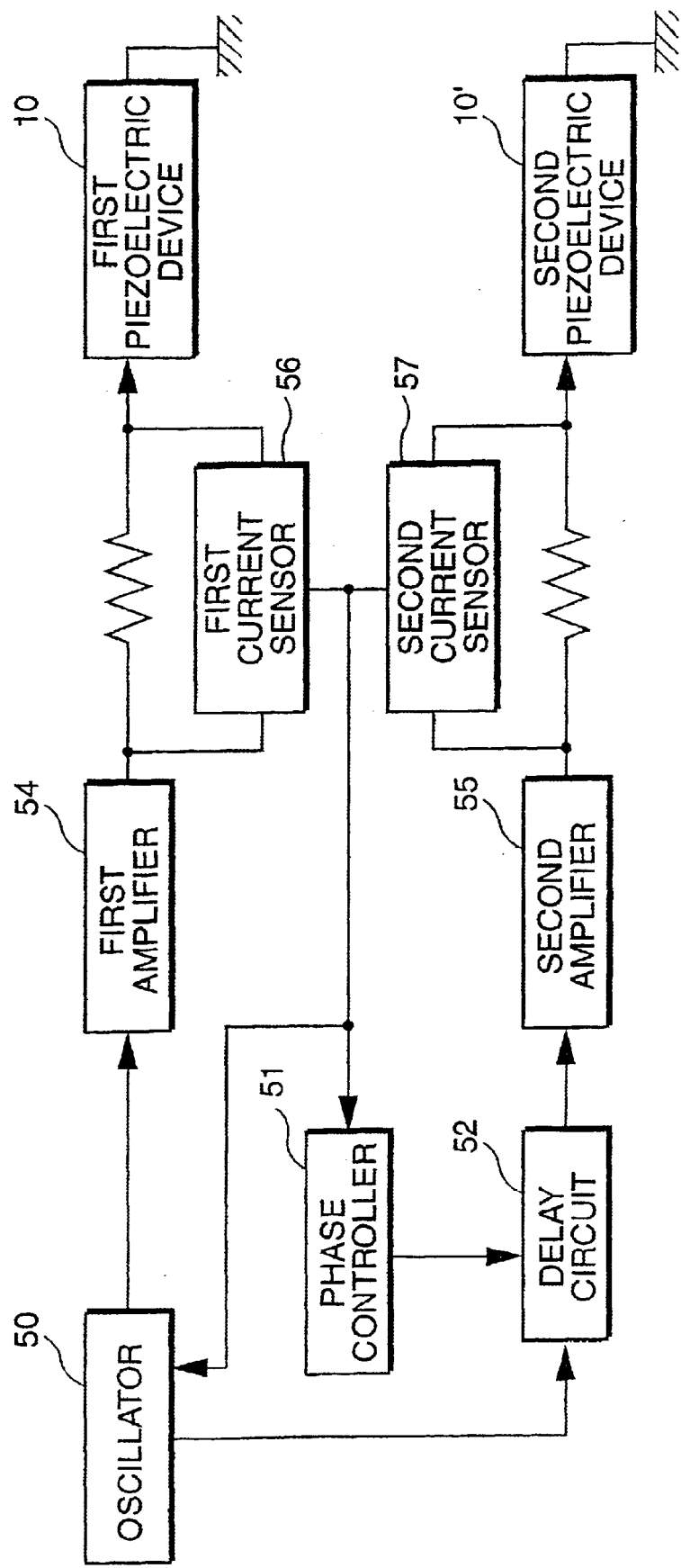
FIG. 23 is a block diagram for showing a configuration of still another modified driving circuit of the actuator in this embodiment.

A block diagram of the driving circuit suitable for the second method is shown in FIG. 23. An oscillator 50 generates sine wave signals having a predetermined frequency. The frequency of the sine wave signals is variable. A phase controller 51 controls a delay circuit 52 so as to generate sine wave signals having a predetermined phase difference. A first amplifier 54 and a second amplifier 55 amplify two sine wave signals having the phase difference, and apply the amplified sine wave signals to the first piezoelectric device 10 and the second piezoelectric device 10'. A first current sensor 56 senses a value of a current flowing in the mechanical arm of the first piezoelectric device 10. A second current sensor 57 senses a value of a current flowing in the mechanical arm of the second piezoelectric device 10'. The sensing results of the first current sensor 56 and the second current sensor 57 are inputted to the oscillator 50 and the phase controller 51. The oscillator 50 searches the frequency "$f_e$" at which the displacement of the first piezoelectric device 10 coincides with the displacement of the second piezoelectric device 10' in the vicinity of the resonance frequency "$f_a$" of the first piezoelectric device 10 and the resonance frequency "$f_b$" of the second piezoelectric device 10' from the current signals from the first current sensor 56 and the second current sensor 57. When the frequency "$f_e$" of the driving signals is found, the oscillator 50 continues to oscillate the sine wave signals at the frequency "$f_e$". The phase controller 51 controls the delay circuit 52 so that the phase difference between the phase of the current signal from the first current sensor 56 and the phase of the current signal from the second current sensor 57 becomes 90 degrees.

As a method for deciding the frequency "$f_e$" of the driving signals, the frequency of the oscillation of the oscillator 50 is gradually varied and the frequency "$f_e$" at which the current value or the amplitude of the current signal from the first current sensor 56 coincides with the current value or the amplitude of the current signal from the second current sensor 57 is found.

When the driving circuit shown in FIG. 23 is compared with the driving circuit shown in FIG. 17, the amplitude controller 53 is not necessary, so that the configuration of the driving circuit can be simplified. Furthermore, the amplitude of the Voltage of the driving signals is not adjusted, so that the control of the actuator can be simplified.

Still another modification of the actuator in this embodiment is described. In this embodiment, the piezoelectric device is used as the displacing device. The ceramic material of the ceramic thin plate 11 has larger damping factor of the vibrations and the smaller magnification factor of the resonant vibration than those of the metal materials. Furthermore, the ceramic material is stronger with respect to the pressure but weaker with respect to the tension, so that it will be separated from the adhered faces in the lamination type piezoelectric device. In this modification, a series connection of a single layered piezoelectric device and an elastic member made of a metal is used as a displacing device.

Figure 24:
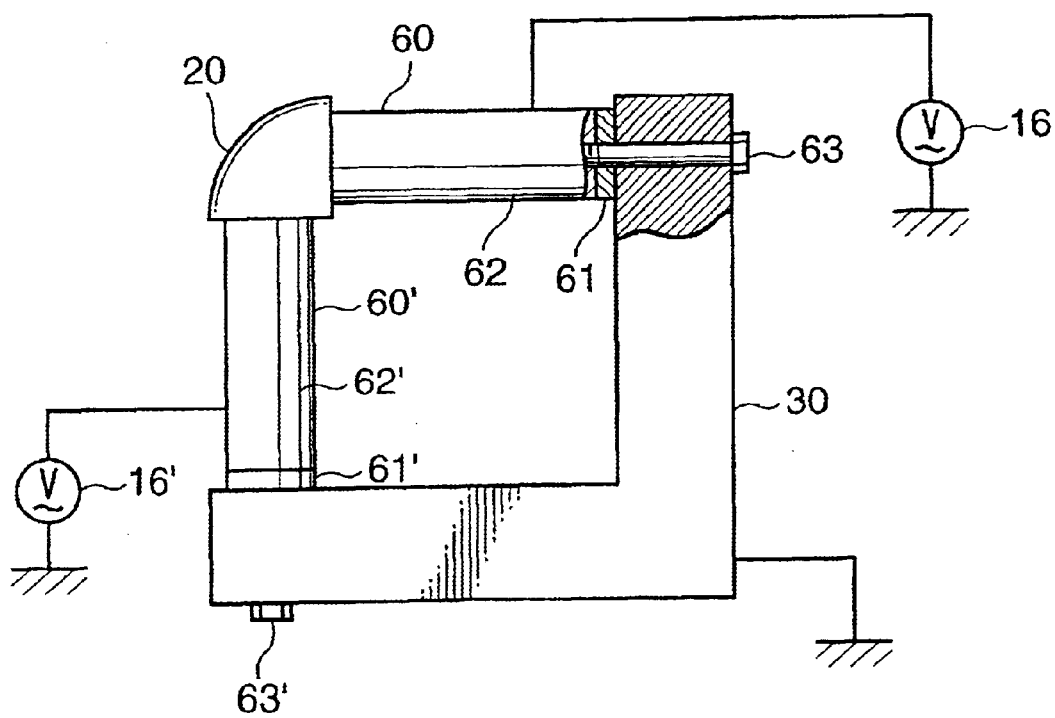
FIG. 24 is front view for showing a modified configuration of an actuator in this embodiment.

A configuration of the modified actuator is shown in FIG. 24. A first displacing device 60 and a second displacing device 60' are respectively configured by single layered piezoelectric devices (ceramic thin plates) 61 and 61', and elastic members 62 and 62'. No electrode is provided on both surface of the piezoelectric devices 61 and 61'. Base ends of the first displacing device 60 and the second displacing device 60' are respectively fixed on the base member by screws 63 and 63' without using any adhesive. On the other hand, the chip member 20 is connected on top ends of the first displacing device 60 and the second displacing device 60' by an adhesive or screws. The elastic members 62 and 62' and the base member 30 are respectively formed by conductive materials. A driving power source 16 is connected between alternative of elastic members 61 and the base member 30 and the elastic member 62' and the base member 30 so as to drive the first displacing device 60 or the second displacing device 60' at the above-mentioned resonance frequencies.

When the elastic member 62 or 62' is vibrated at the resonance frequency by the piezoelectric device 61 or 61' using as an oscillator, the displacement of the first displacing device 60 or the second displacing device 60' can be enlarged. Furthermore, the tension acting on the piezoelectric devices 61 and 61' becomes smaller, so that the destruction of the piezoelectric device 61 and 61' can be prevented. As a material of the elastic member 62 and 62', aluminum, titanium, iron, copper, and an alloy including at least one of them can be used. Since the ratio of the piezoelectric devices 61 and 61' in the length of the displacing devices 60 and 60' is very small, the affect due to the piezoelectric devices 61 and 61' can be ignored when the above-mentioned normal vibration is calculated.

In the above-mentioned description of the embodiment, two displacing devices such as the first piezoelectric device 10 and the second piezoelectric device 10' or the first displacing device 60 and the second displacing device 60' are disposed for crossing at right angle. It, however, is not restricted by this disposition. It is possible to cross at another angle such as 45 degrees or 135 degrees. Furthermore, the number of the displacing devices are not restricted by two. It is possible to use more than three displacing devices for realizing a movement having three or four degrees of freedom. Still furthermore, it is possible to use another mechanical or electric displacing device such as a magnetostrictive device as a driving source.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An actuator comprising:
   a plurality of displacing devices for generating displacements;
   a compound member, connected to the displacing devices, for compounding displacements of the displacing devices;
   a base member for holding base ends of the displacing devices to which the compound member is not connected;
   a pressing member for pressing the compound member to an object to be driven; and
   a driver for resonantly driving the displacing devices so as to move the compound member along an elliptic or a circular trail;
   wherein the displacing devices have a first natural frequency in a first natural vibration mode, in which the displacing devices are resonantly vibrated in the same phase, that substantially coincides with a second natural frequency in a second natural vibration mode, in which the displacing devices are resonantly vibrated in the opposite phase.

2. An actuator in accordance with claim 1, wherein at least one of the plurality of displacing devices includes an elastic member as a part thereof.

3. An actuator in accordance with claim 1, wherein a mass of the compound member is designated by a symbol "M", a length of each displacing device is designated by a symbol "L", a height of each displacing device is designated by a symbol "H", and a mass of each displacing device is designated by a symbol "m", and the equation $$M=(L^2/H^2-0.88)m/2.63$$

is satisfied.

4. An actuator in accordance with claim 1, wherein a mass of the compound member is designated by a symbol "$M_c$", a mass of each displacing device is designated by a symbol "m", a spring constant of each displacing device in the expansive deformation is designated by a symbol "$k_1$", a spring constant of each displacing device in the bending deformation is designated by a symbol "$k_3$", a moment of inertia of the base member is designated by a symbol "$I_z$", a rotation radius of the base member is designated by a symbol "R", and an equivalent mass of the base member converted to a cantilever is designated by a symbol "$M_b{'}$", and the equations $$(k_1/(1-p))/(M_c+(1-p)m/3)=(k_1/(1-q)+k_3)/(M_c+(1-q)m/3+m/2)$$

$$p=(M_c+m/3)/(M_c+I_z/R^2+2m/3)$$

$$q=(M_c+5m/6)/(M_c+M_b{'}+7m/6)$$

are satisfied.

5. An actuator comprising:
   a first displacing device;
   a second displacing device;
   a compound member connected to top ends of the first displacing device and the second displacing device and for compounding displacements of the first displacing device and the second displacing device; and
   a driver for resonantly driving the displacing devices so as to move the compound member along an elliptic or a circular trail,
   wherein the driver drives the first displacing device and the second displacing device by driving signals respectively having a frequency that is between a first frequency and a second frequency, wherein the first frequency is a higher one of a resonant frequency of the first displacing device and a resonant frequency of the second displacing device, and wherein die second frequency is a lower one of an antiresonant frequency of the first displacing device and an antiresonant frequency of the second displacing device.

6. An actuator in accordance with claim 5, wherein the phase of the driving signal for driving the first displacing device has a phase difference with respect to the driving signal for driving the second displacing device.

7. An actuator comprising:

a first displacing device;

a second displacing device;

a compound member connected to top ends of the first displacing device and the second displacing device and for compounding displacements of the first displacing device and the second displacing device; and a driver for resonantly driving the displacing devices so as to move the compound member along an elliptic or a circular trail, wherein the driver drives the first displacing device and the second displacing device by using a first displacing device driving signal and a second displacing device driving signal, respectively, each of the driving signals having a frequency included in an overlapped region of a first frequency band and a second frequency band, wherein the first frequency band is defined as a region between a resonance frequency of the first displacing device and an antiresonance frequency of the first displacing device in which a phase difference between a phase of a voltage of the first displacing device driving signal and a phase of a current flowing in the first displacing device is substantially constant, wherein the second frequency band is defined as a region between a resonance frequency of the second displacing device and an antiresonance frequency of the second displacing device in which a phase difference between a phase of a voltage of the second displacing device driving signal and a phase of a current flowing in the second displacing device is substantially constant, wherein the frequency of the driving signals is a value at the center between a first frequency and a second frequency, wherein the first frequency is a smaller one of the resonance frequencies of the first displacing device and the second displacing device, and wherein the second frequency is a smaller one of the antiresonance frequencies of the first displacing device and the second displacing device.

8. An actuator comprising:

a first displacing device;

a second displacing device;

a compound member connected to top ends of the first displacing device and the second displacing device and for compounding displacements of the first displacing device and the second displacing device;

a driver for resonantly driving the displacing devices so as to move the compound member along un elliptic or a circular trail, and current sensors respectively for sensing currents flowing in the first displacing device and the second displacing device, wherein the driver drives the first displacing device and the second displacing device by using a first displacing device driving signal and a second displacing device driving signal, respectively, each of the driving signals having a frequency included in an overlapped region of a first frequency band and a second frequency band, wherein the first frequency band is defined as a region between a resonance frequency of the first displacing device and an antiresonance frequency of the first displacing device in which a phase difference between a phase of a voltage of the first displacing device driving signal and a phase of a current flowing in the first displacing device is substantially constant, and wherein the second frequency band is defined as a region between a resonance frequency of the second displacing device and an antiresonance frequency of the second displacing device in which a phase difference between a phase of a voltage of the second displacing device driving signal and a phase of a current flowing in the second displacing device is substantially constant.

9. An actuator comprising:

a first displacing device;

a second displacing device;

a compound member connected to top ends of the first displacing device and the second displacing device and for compounding displacements of the first displacing device and the second displacing device;

a driver for resonantly driving the displacing devices so as to move the compound member along an elliptic or a circular trail; and current sensors respectively for sensing currents flowing in the first displacing device and the second displacing device, wherein the driver drives the first displacing device and the second displacing device by driving signals respectively having a frequency included in a frequency band in the vicinity of resonance frequencies of the first displacing device and the second displacing device at which a displacement of the first displacing device is substantially the same as that of the second displacing device.

10. An actuator in accordance with claim 9, wherein a phase difference is provided between the driving signals in a manner so that a current flowing in the first displacing device has a predetermined phase difference with respect to a current flowing in the second displacing device.

11. A method for driving an actuator which comprises a first displacing device, a second displacing device, and a compound member connected to top ends of the first displacing device and the second displacing device for compounding displacements of the first displacing device and the second displacing device, said method comprising the step of:

driving each of the first displacing device and the second displacing device in a manner so as to move the compound member along an elliptic or a circular trail by using a first displacing device driving signal and a second displacing device driving signal, respectively, each of the driving signals having a frequency that is between a first frequency and a second frequency, wherein the first frequency is a higher one of a resonant frequency of the first displacing device and a resonant frequency of the second displacing device, and wherein the second frequency is a lower one of an antiresonant frequency of the first displacing device and an antiresonant frequency of the second displacing device.

12. A method for driving the actuator in accordance with claim 11, wherein the phase of the first displacing device driving signal has a phase difference with respect to the second displacing device driving signal.

13. A method for driving an actuator which comprises a first displacing device, a second displacing device, and a compound member connected to top ends of the first displacing device and the second displacing device for compounding displacements of the first displacing device and the second displacing device, said method comprising the step of:

driving each of the first displacing device and the second displacing device in a manner so as to move the compound member along an elliptic or a circular trail by using a first displacing device driving signal and a second displacing device driving signal, respectively, each of the driving signals having a frequency included in an overlapped region of a first frequency band and a second frequency band, wherein the first frequency band is defined as a region between a resonance frequency of the first displacing device and an antiresonance frequency of the first displacing device in which a phase difference between a phase of a voltage of the first displacing device driving signal and a phase of a current flowing in the first displacing device is substantially constant, wherein the second frequency band is defined as a region between a resonance frequency of the second displacing device and an antiresonance frequency of the second displacing device in which a phase difference between a phase of a voltage of the second displacing device driving signal and a phase of a current flowing in the second displacing device is substantially constant, wherein the frequency of the driving signals is a value at a center between a first frequency and a second frequency, wherein the first frequency is a smaller one of the resonance frequencies of the first displacing device and the second displacing device, and wherein the second frequency is a smaller one of the antiresonance frequencies of the fist displacing device and the second displacing device.

14. A method for driving an actuator which comprises a first displacing device, a second displacing device, and a compound member connected to top ends of the first displacing device and the second displacing device for compounding displacements of the first displacing device and the second displacing device, said method comprising the step of:

driving each of the fist displacing device and the second displacing device in a manner so as to move the compound member along an elliptic or a circular trail by using a first displacing device driving signal and a second displacing device driving signal, respectively, each of the driving signals having a frequency included in a frequency band in the vicinity of resonance frequencies of the first displacing device and the second displacing device at which a displacement of the first displacing device is substantially the same as that of the second displacing device; and sensing a current flowing through the first displacing device and a current flowing through the second displacing device.

15. A method for driving the actuator in accordance with claim 14, further comprising the step of adjusting a phase difference between the first displacing device driving signal and the second displacing device driving signal so that the current flowing in the first displacing device has a predetermined phase difference with respect to the current flowing in the second displacing device.

* * * * *

UNITED STATES PATENT AND TRADEMARK OFFICE
CERTIFICATE OF CORRECTION

PATENT NO.     : 6,713,943 B1
DATED          : March 30, 2004
INVENTOR(S)    : Shinya Matsuda et al.

It is certified that error appears in the above-identified patent and that said Letters Patent is hereby corrected as shown below:

Column 8,
Line 48, delete "$\omega_2=K/(\mu L/3)=K/(m/3)$", and insert -- $\omega^2=K/(\mu L/3)=K/(m/3)$ --.

Column 15,
Line 65, delete "10´ having", and insert -- 10´ having --.

Column 16,
Line 9, delete "10´ advances", and insert -- 10´ advances --.

Column 21,
Line 6, delete "die", and insert -- the --.
Line 63, delete "un", and insert -- an --.

Column 24,
Lines 5 and 15, delete "fist", and insert -- first --.

Signed and Sealed this

Sixteenth Day of November, 2004

JON W. DUDAS
*Director of the United States Patent and Trademark Office*